United States Patent [19]
Nakayama et al.

[11] Patent Number: 5,334,835
[45] Date of Patent: Aug. 2, 1994

[54] PROBE DRIVE MECHANISM AND ELECTRONIC DEVICE WHICH USES THE SAME

[75] Inventors: Masaru Nakayama; Osamu Takamatsu, both of Atsugi; Takayuki Yagi, Machida; Keisuke Yamamoto, Yamato; Takehiko Kawasaki, Isehara; Yasuhiro Shimada; Yoshio Suzuki, both of Atsugi, all of Japan

[73] Assignee: Canon Kabushiki Kaisha, Tokyo, Japan

[21] Appl. No.: 951,751

[22] Filed: Sep. 28, 1992

[30] Foreign Application Priority Data

Oct. 3, 1991 [JP] Japan .................................. 3-281891
Aug. 26, 1992 [JP] Japan .................................. 4-248925

[51] Int. Cl.⁵ ............................................ H01J 37/00
[52] U.S. Cl. ...................................... 250/306; 250/307
[58] Field of Search ...................... 250/306, 307, 442.1

[56] References Cited

U.S. PATENT DOCUMENTS 4,237,379 12/1980 Deckert et al. ...................... 250/302
4,638,206 1/1987 Tsunooka et al. ............... 310/313 B
4,906,840 3/1990 Zdeblick et al. ................. 250/442.11

FOREIGN PATENT DOCUMENTS 63-161552 7/1988 Japan .
63-161553 7/1988 Japan .

OTHER PUBLICATIONS

G. Binning, et al., "Surface Studies by Scanning Tunneling Microscopy", Physical Review Letters, The American Physical Society, vol. 49, No. 1, pp. 57-60 (Jul. 5, 1982).
Shinya Akamine, et al., "Microfabricated Scanning Tunneling Microscope", IEEE Electron Device Letters, vol. 10, No. 11, pp. 490-492 (Nov. 10, 1989).
Transducers '89, The 5th International Conference on Solid-State Sensors and Actuators & Eurosensors III, Abstracts, Conference Organizers in Medicine, Science and Technology, Lecture No. D3.6, p. 271 (Jun. 25-30, 1989).

*Primary Examiner*—Bruce C. Anderson
*Attorney, Agent, or Firm*—Fitzpatrick, Cella Harper & Scinto

[57] ABSTRACT

A probe drive mechanism includes a cantilever portion in which a piezoelectric layer is disposed between electrode layers, and a circuit portion which is positioned adjacent to the cantilever portion and drives the cantilever. The cantilever portion and the circuit portion are formed on the same substrate. A protection layer covers the circuit portion and part of the substrate, and the cantilever portion is formed on the protection layer adjacent to the circuit portion.

33 Claims, 17 Drawing Sheets

PROBE DRIVE MECHANISM AND ELECTRONIC DEVICE WHICH USES THE SAME

BACKGROUND OF THE INVENTION

1. Field of the Invention

The present invention relates to a method of manufacturing an integrated cantilever drive mechanism, a method of manufacturing an integrated prove drive mechanism, a cantilever drive mechanism manufactured by the aforesaid method, a probe drive mechanism manufactured by the aforesaid method, a scanning tunnel microscope (STM) which utilizes the aforesaid mechanism and an electronic device such as an information processing apparatus which utilizes the principle so as to record and/or reproduce information at high density.

2. Related Background Art

Recently, an STM capable of directly observing the electronic structure of surface atoms of a conductor has been developed (G. Binnig et.al., Phys. Rev. Lett. 49 (1982) 57) so that an actual space image can be measured at a significantly high resolution (nanometer or less) regardless of the fact that the material is single crystal or amorphous structure.

The STM utilizes a phenomenon that a tunnel current passes when voltage is applied to a portion between a metal probe and a conductive material and they are brought closer at a distance of about 1 nm and the aforesaid current is changed expotentially because it is very sensitive to the change in the distance between the two elements.

By scanning the probe while maintaining the tunnel current at a constant level, the surface structure in an actual space can be observed at a resolution of an order of an atom. Although the analysis to be performed by using the STM is adapted to only the conductive materials, it has been applied to the analysis of the structure of a thin insulating film formed on the surface of the conductive material.

Furthermore, the aforesaid apparatus or means employs a method of detecting a small electric current so that an advantage is realized in that the observation can be performed with a small amount of electricity while preventing damage to the medium. In addition, wide use of the STM has been expected because it can be operated in the atmosphere.

In particular, the practical application of the STM to serve as a high density recording/reproducing apparatus has been positively promoted as disclosed in Japanese Patent Laid-Open No. 63-161552 and Japanese Patent Laid-Open No. 63-161553. The aforesaid high density recording and/or reproducing apparatus is so arranged that a probe similar to that of the STM is used to perform recording while changing the voltage to be applied to a portion between the probe and a recording medium. As the recording medium, a thin layer made of a $\pi$-electron type organic compound is used, which is a material having a switching characteristic with a memory capability of voltage-current characteristics. The reproduction is performed by utilizing the change in the tunnel resistance between the region which has been subject to the aforesaid recording process and a region which has not been subjected to the same.

As the recording medium adapted to the aforesaid recording method, a medium the surface shape of which is changed due to the voltage applied to the probe is able to perform the recording/reproducing operations.

In a case where the STM is operated or the recording/reproducing operation by using the STM is performed, the distance from the probe to the sample or the recording medium must be controlled to an order of Å. Furthermore, the two-dimensional scanning of the probe must be controlled to an order of several tens of Å in the recording/reproducing operation for the purpose of recording/reproducing information items arranged two-dimensionally on the medium. In addition, in order to improve the function of the recording/reproducing system, and in particular, to raise the processing speed, an arrangement has been disclosed in which a multiplicity of probes are selectively driven to detect the tunnel current.

That is, the relative position between the probe and the medium must be three-dimensionally controlled at the aforesaid accuracy in a region in which a multiplicity of the probes are disposed. The aforesaid control is performed by using a laminated-type piezoelectric device or a cylindrical piezoelectric device, or the like fastened to a portion including the probe or a portion including the medium.

However, since the aforesaid devices are not suitable to be integrated although a large quantity of change can be allowed, it is disadvantageous to employ them in a multi-probe type recording and/or reproducing apparatus.

In the aforesaid viewpoint, a method has been disclosed in which the probe is fastened on a cantilever having a length of hundreds of $\mu$m and the cantilever is driven by a piezoelectric member (C. F. Quate et al., Transducer, '89, lecture No. D3.6, June 1989. IEEE Electron Device Letters 10 (1989), Nov. No. 11).

A method of manufacturing a conventional cantilever will now be described with reference to the drawings.

FIG. 12 illustrates the overall body of a cantilever probe. A substrate 1 is made of silicone, and an actuator (drive portion) is formed into a cantilever having a piezoelectric bimorph structure. The actuator has a zinc oxide layer, a dielectric layer and a metal electrode stacked alternately. FIG. 13 is a cross-sectional view which illustrates the cantilever shown in FIG. 12. The cantilever is arranged in such a manner that an upper electrode and a lower electrode are disposed while being vertically separated from each other and a thin electrode for the tunnel tip is disposed at the central portion of the free end portion. By suitably combining the way the voltage reaches the portion between the electrodes, the electrode can be moved in three axial directions.

The aforesaid cantilever is formed as follows:

First, the silicon substrate is subjected to an anisotropic etching process so as to reduce the thickness of the region, which will be formed into the cantilever, to about several tens of $\mu$m. An electrode 9 is made of metal such as aluminum and a piezoelectric layer 8 made of zinc oxide or the like is formed by a sputtering method. Each piezoelectric layer is held between silicon nitride films by a plasma CVD (Chemical Vapor Deposition) method.

The upper electrode is covered with gold in order to prevent undesirable oxidation of the surface of a tunnel chip 11. After the overall body of the cantilever has been formed, polyimide is applied to the surface to a thickness of several $\mu$m. A silicon membrane is removed by plasma etching effected from the reverse side of the wafer and the polyimide is removed by oxygen plasma, so that the cantilever is formed.

However, since driving of a plurality of the cantilevers, detection and/or amplification of the tunnel current and feedback of the drive from the tunnel current must be selectively performed at the time of the recording/reproducing operation, switching circuits, bias circuits, amplifying circuits and servo circuits and the like must be provided for the purpose of realizing the aforesaid functions. The aforesaid circuits must be formed on the same substrate on which the cantilever is formed in order to reduce the size and to raise the processing speed.

SUMMARY OF THE INVENTION

An object of the present invention is to provide methods of manufacturing a novel cantilever drive mechanism and a probe drive mechanism which is capable of maintaining the drive characteristics of a cantilever and a cantilever probe and which can be integrally formed.

Another object of the present invention is to provide a cantilever drive mechanism the size of which can be reduced, which can be also used as an actuator, and which exhibits excellent durability.

Another object of the present invention is to provide a probe drive mechanism, the size of which can be reduced, which is suitable to a high density recording and reproducing operation and which exhibits excellent durability.

Another object of the present invention is to provide a scanning type tunnel microscope and an information apparatus enabling size reduction and high speed processing.

The aforesaid objects can be achieved by the following inventions.

According to one aspect of the invention, a method of manufacturing a cantilever drive mechanism, having a cantilever portion in which a piezoelectric layer is disposed between electrode layers, and a circuit portion, positioned adjacent to the cantilever portion and driving the cantilever portion, that are formed on the same substrate, comprises the steps of forming a circuit portion and then forming a cantilever portion after the circuit portion is formed.

In accordance with another aspect of the present invention, a method of manufacturing a probe drive mechanism, having a cantilever portion with a piezoelectric layer disposed between electrode layers, a micro-tip for detecting a tunnel current and an electrode for receiving the tunnel current, and a processing circuit portion, which is positioned adjacent to the cantilever portion, drives the cantilever portion and detects and amplifies the tunnel current, that are formed on the same substrates, comprises the steps of forming the processing circuit portion, and then forming the cantilever portion after the processing circuit portion is formed.

In accordance with still another aspect of the present invention, a method of manufacturing a cantilever drive mechanism, having a cantilever portion with a piezoelectric layer disposed between electrode layers, and a circuit portion, positioned adjacent to the cantilever portion and which drives the cantilever portion, that are formed on the same substrate, comprises the steps of forming a first insulating layer on the substrate, forming a second insulating layer on the first insulating layer, patterning and etching the second insulating layer to remove a portion where the cantilever portion will be formed, forming an electrode layer on the first and second insulating layers, patterning and etching the electrode layer to remove a portion where the cantilever portion will be formed, removing the first insulating layer at a portion where the cantilever portion will be formed, forming a protection layer on the electrode layer in the first and second insulating layers to form the circuit portion, stacking an electrode layer and a piezoelectric layer on the protection layer adjacent to the circuit portion, and removing the substrate and a protection layer from the cantilever portion.

In accordance with yet another aspect of the present invention, a method of manufacturing a probe drive mechanism having a cantilever portion, with a piezoelectric layer disposed between electrode layers, a micro-tip for detecting the tunnel current and an electrode for receiving the tunnel current, and a processing circuit portion, positioned adjacent to the cantilever portion and which drives the cantilever portion and detects and amplifies the tunnel current, that are formed on the same substrate, comprises the same steps as set forth above with respect to the method of manufacturing the cantilever drive mechanism.

In accordance with another aspect of the present invention, a method of manufacturing a cantilever drive mechanism, having a cantilever portion with a piezoelectric layer disposed between electrode layers, and a circuit portion, positioned adjacent to the cantilever portion and which drives the cantilever portion, that are formed on the same substrate, comprises the steps of forming a first insulating layer on the substrate, forming a second insulating layer on the first insulating layer, forming an electrode layer on the second insulating layer, patterning and etching the electrode layer to remove it from a portion where the cantilever portion will be formed, removing the first insulating layer and the second insulating layer at a portion where the cantilever portion will be formed, stacking a protection layer on the electrode layer and the first and second insulting layers to form a circuit portion, stacking an electrode layer and a piezoelectric layer on the protection layer adjacent to the circuit portion, and removing a portion of the substrate and a protection layer to form the cantilever portion.

In accordance with yet another aspect of the present invention, a method of manufacturing a probe drive mechanism, having a cantilever portion with a piezoelectric layer disposed between electrode layers, a micro-tip for detecting a tunnel current and an electrode for receiving the tunnel current, and a processing circuit portion, positioned adjacent to the cantilever portion and which drives the cantilever and detects and amplifies the tunnel current, that are formed on the same substrate, comprises the same steps as discussed above for manufacturing the cantilever drive mechanism.

In accordance with still another aspect of the present invention, a cantilever drive mechanism comprises a cantilever portion having a piezoelectric layer disposed between electrode layers. and a circuit portion positioned adjacent to the cantilever portion and which drives the cantilever portion. The cantilever portion and the circuit portion are formed on a single substrate, with the circuit portion being covered with a protection layer and the cantilever portion being formed on a protection layer adjacent to the circuit portion.

In accordance with another aspect of the present invention, a probe drive mechanism comprises a cantilever portion having a piezoelectric layer disposed between electrode layers, a micro-tip for detecting a tunnel current and an electrode for receiving a tunnel current, a processing circuit portion, positioned adjacent to the cantilever portion, which drives the cantilever and detects and amplifies the tunnel current, and a substrate for supporting the cantilever portion and the processing portion. The circuit portion is covered with a protection layer and a cantilever portion is formed on the protection layer adjacent to the processing circuit portion.

In accordance with yet another aspect of the present invention, a cantilever drive mechanism comprises a cantilever portion having a piezoelectric layer disposed between electrode layers, a circuit portion positioned adjacent to the cantilever portion and which drives the cantilever portion, and a substrate for supporting the cantilever portion and a circuit portion. A circuit portion is covered with a protection layer, and the cantilever portion is formed on the protection layer adjacent to the circuit portion, wherein the piezoelectric layer of the cantilever portion is composed of a plurality of stacked layers having polarization axes in different polarization directions.

In accordance with still another aspect of the present invention, a probe drive mechanism comprises a cantilever portion having a piezoelectric layer disposed between electrode layers, a micro-tip for detecting a tunnel current and an electrode for receiving the tunnel current, a processing circuit portion positioned adjacent to the cantilever portion which drives the cantilever and detects and amplifies the tunnel current, and a substrate for supporting the cantilever portion and the circuit portion. The circuit portion is covered with a protection layer and the cantilever portion is formed on the protection layer adjacent to the circuit portion, wherein the piezoelectric layer of the cantilever portion is composed of a plurality of stacked layers having polarization axes in different polarization directions.

According to another aspect of the present invention, there is provided probe drive mechanism comprising a plurality of probe drive mechanisms, wherein the probe drive mechanisms are formed on the same substrate.

According to another aspect of the present invention, there is provided a scanning tunnel microscope comprising a probe drive mechanism, means for relatively moving the probe drive mechanism with respect to a sample surface to be observed, means for applying voltage between the probe and the sample, and means for detecting an electric current which passes between the probe and the sample.

According to another aspect of the present invention, there is provided an information apparatus comprising a probe drive mechanism, means for relatively moving the probe drive mechanism with respect to a recording medium, means for applying voltage for recording and-/or reproducing information between the probe and a sample, and means for detecting an electric current which passes between the probe and the sample.

Other and further objects, features and advantages of the invention will be appear more fully from the following description.

DETAILED DESCRIPTION OF THE PREFERRED EMBODIMENTS

Figure 1:
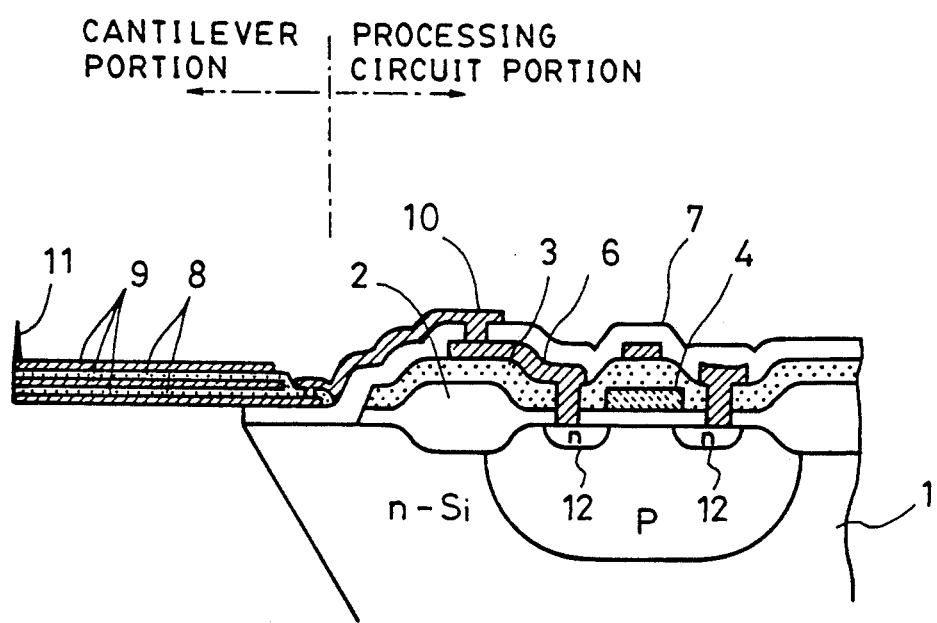
FIG. 1 is a cross-sectional view which illustrates a probe drive mechanism according to the present invention.
Figure 2A:
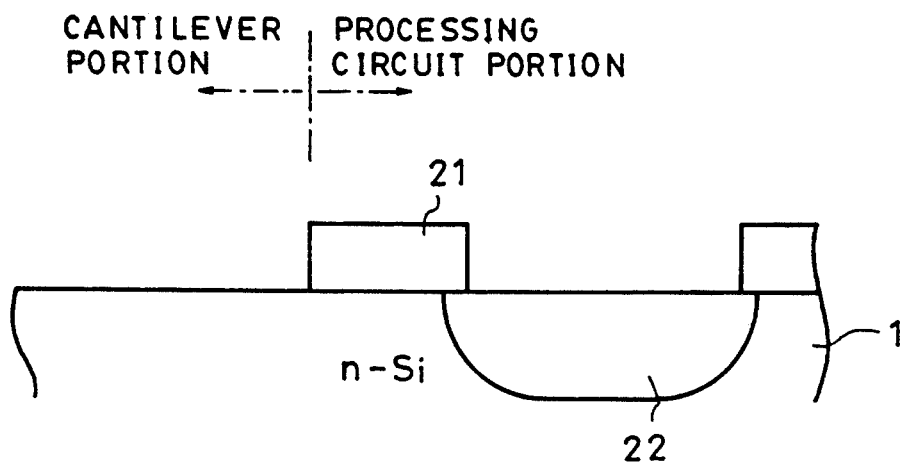
FIGS. 2 (a) to 2 (k) are cross-sectional views which illustrate a first aspect of the manufacturing process of the manufacturing method according to the present invention.
Figure 2B:
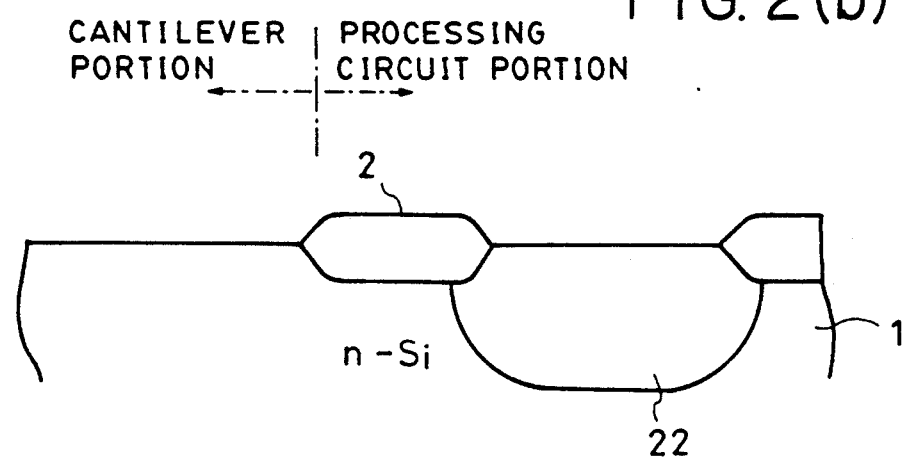
Figure 2C:
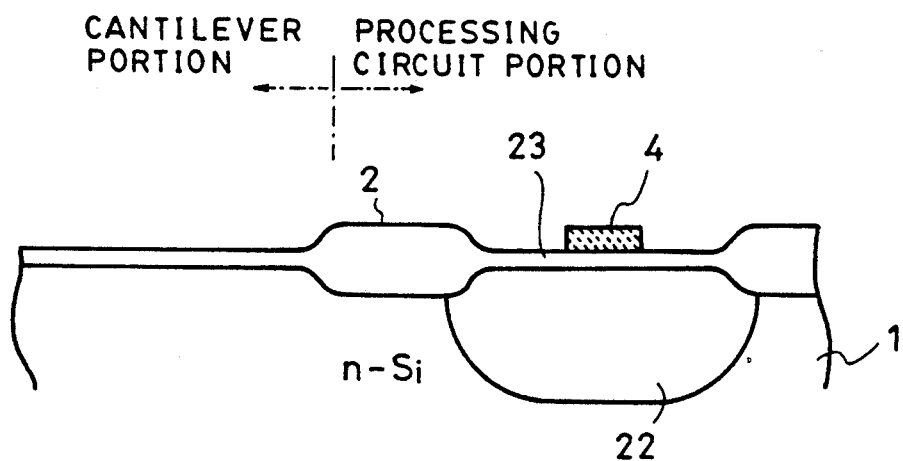
Figure 2D:
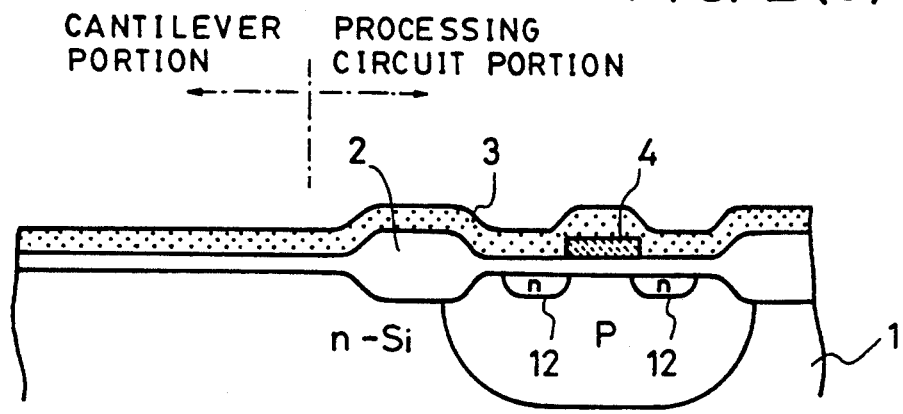
Figure 2E:
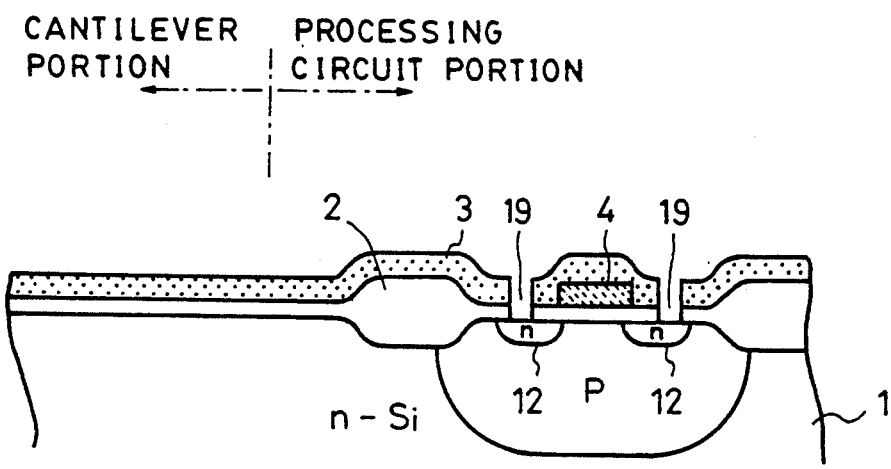
Figure 2F:
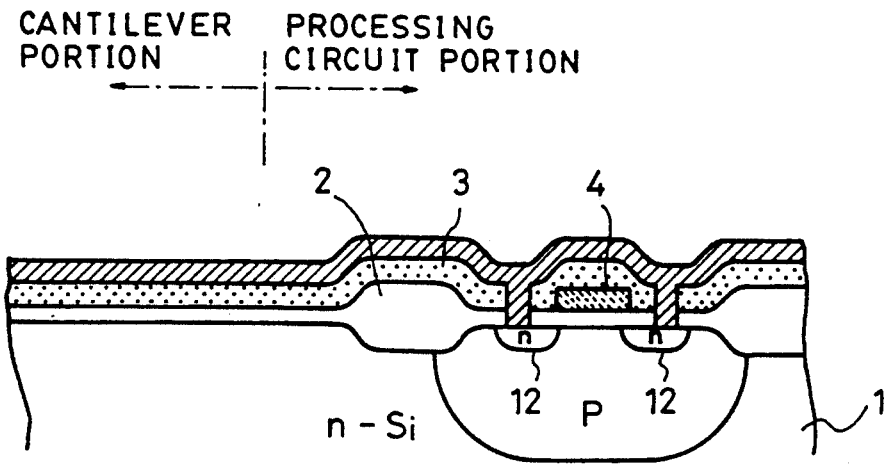
Figure 2G:
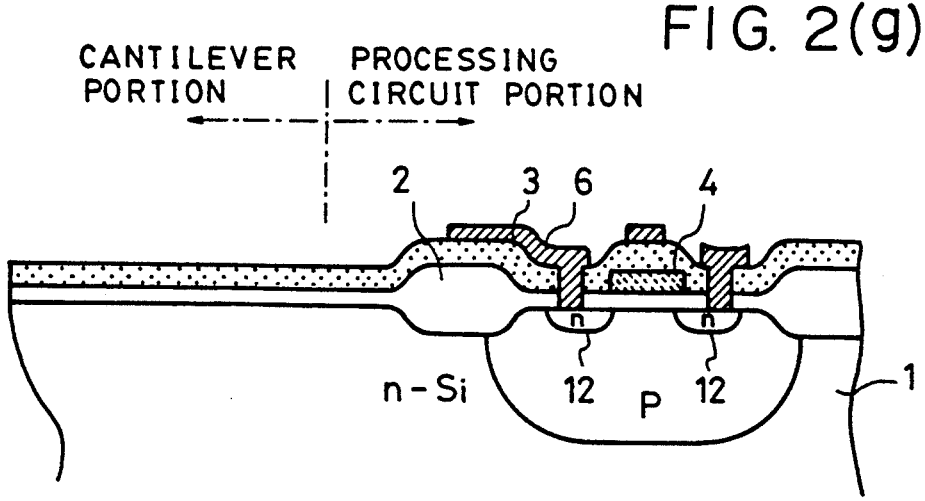
Figure 2H:
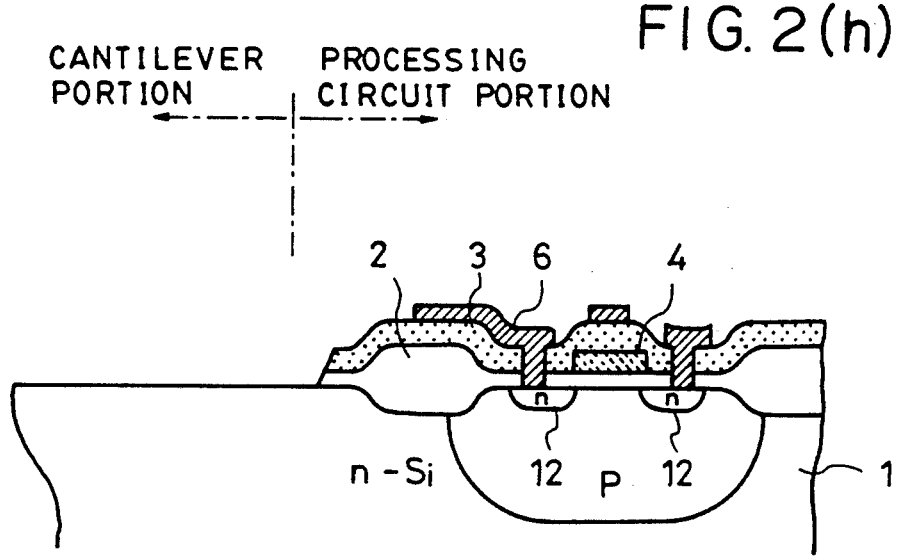
Figure 2I:
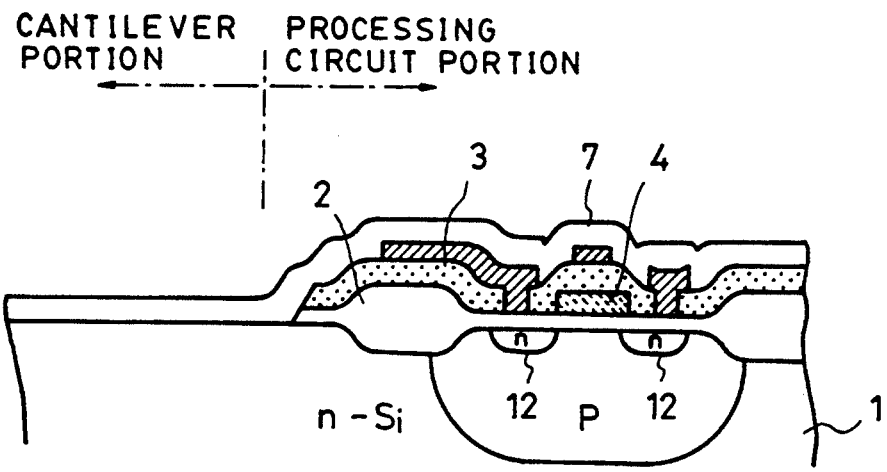
Figure 2J:
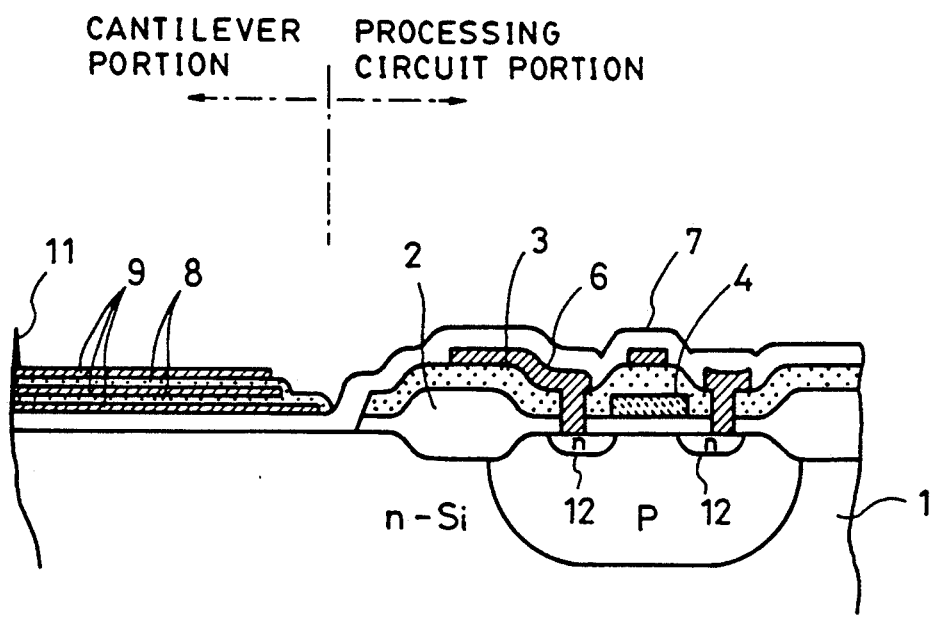
Figure 2K:
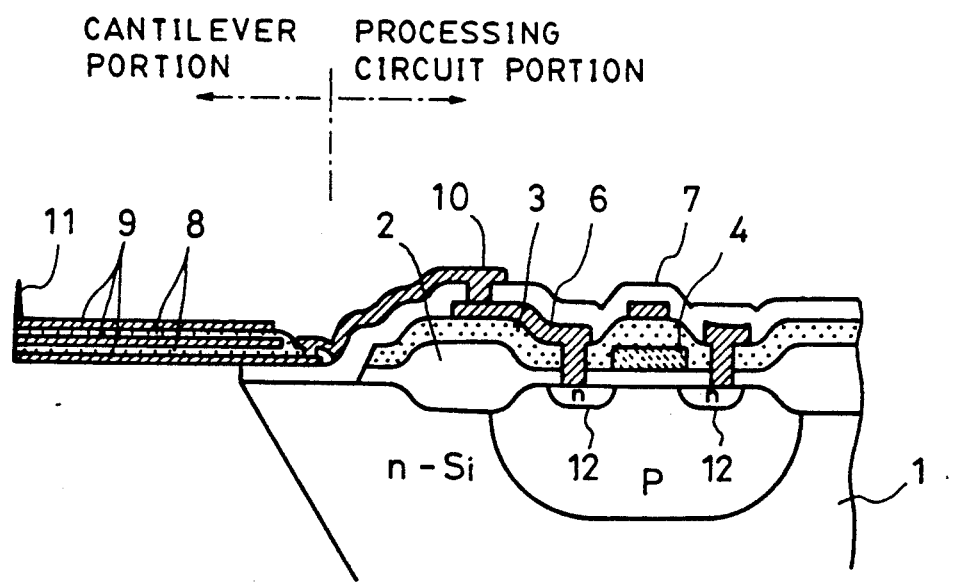
Figure 3A:
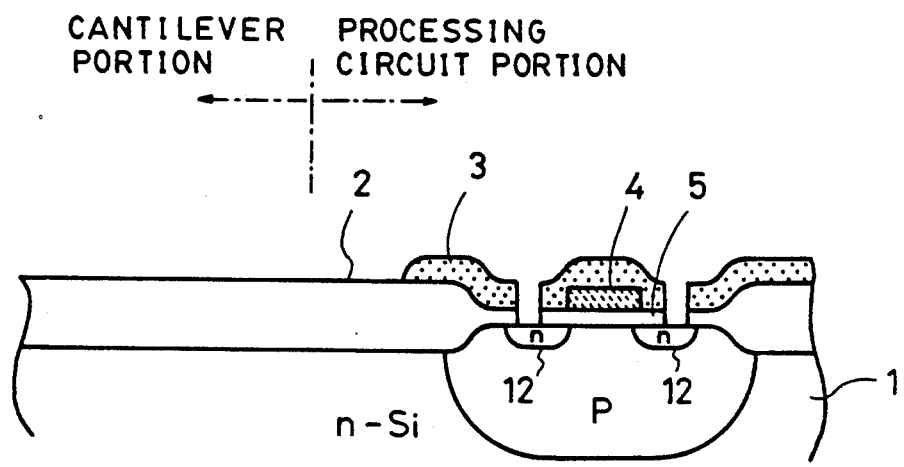
FIGS. 3 (a) to 3 (d) are a cross-sectional views which illustrate a second aspect of the manufacturing process of the manufacturing method according to the present invention.
Figure 3B:
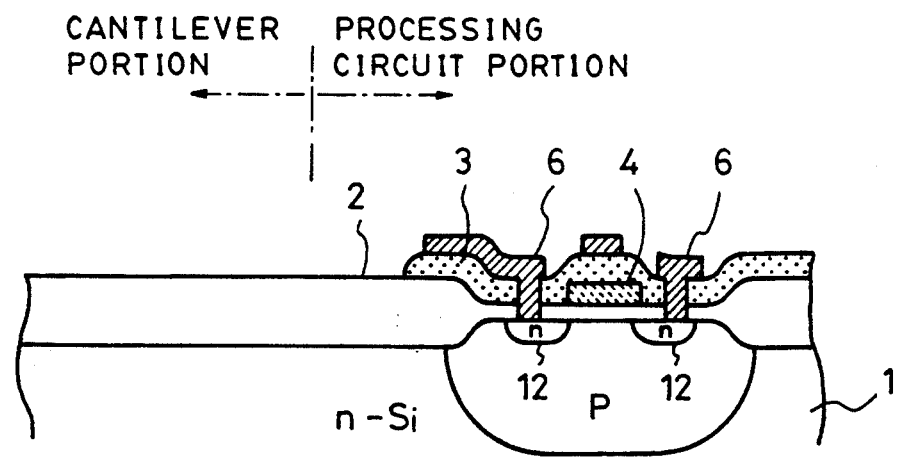
Figure 3C:
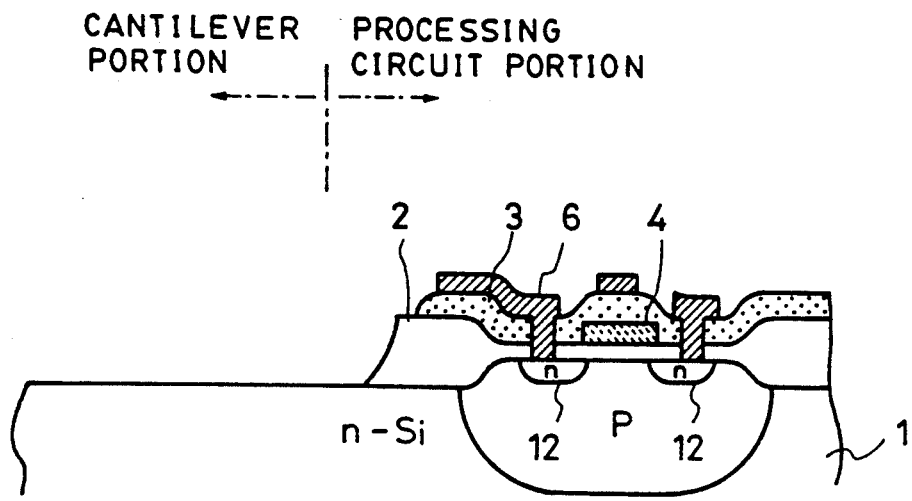
Figure 3D:
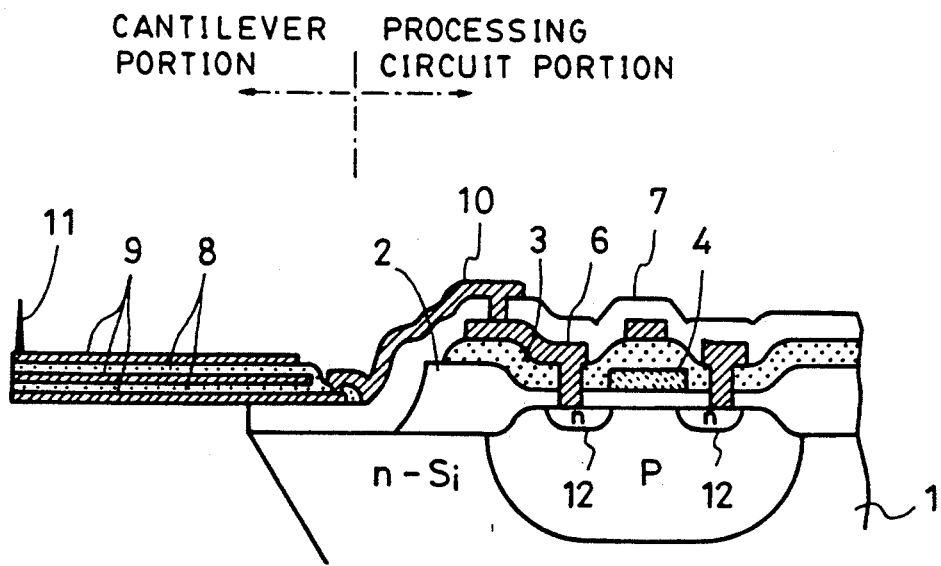

According to the knowledge obtained by the inventor of the present invention, it was found that a process of manufacturing a switching circuit and the like and a process of manufacturing a cantilever portion must be independently performed from each other because the material or the like is different from each other when the switching circuit and the like and the cantilever are manufactured on the same substrate. Furthermore, it was found that a very efficient effect can be obtained when the cantilever portion is formed after the processing circuit portion has been formed. Since the cantilever region does not require the wiring and interlayer insulating layer used at the process of forming the switching circuit and the like, they must be removed before the process of forming the cantilever is performed.

In order to be subjected to a comparison with the present invention, a method of forming the processing circuit and the cantilever on the same substrate will now be described with reference to the drawings.

FIG. 7 (a) illustrates a state where a process of photolithography and etching an interlayer insulating layer 3 of a circuit device has been completed by a conventional method, in which the diffusion process has been completed. The insulating layer 3 in the cantilever region must be removed at the time of etching in order to establish a contact between the substrate 1 and an electric line 6 to be described later. Then, the electrode layer 6 is formed by using a sputter device or the like, so that a structure shown in FIG. 7 (b) is realized. Then, the electrode layer 6 is subjected to a photolithographic and etching process, so that the wiring process of the circuit device is completed (see FIG. 7 (c)). When an Si$_3$N$_4$ or an SiO$_2$ layer 7 serving as a mask layer at the time of the process of anisotropic-etching the silicon substrate 1 is formed, a state shown in FIG. 7 (d) is realized. When an electrode layer 9 and a piezoelectric member layer 8 are then stacked on the cantilever portion adjacent to the circuit portion, a cantilever layer is formed. Then, a micro-tip 11 is formed (see FIG. 7 (e)). An electrode layer 10 for establishing a connection between the electrode 9 for driving the cantilever or taking the tunnel current and the wiring electrode 6 in the circuit portion is formed, and then the Si-substrate 1 and the mask layer 7 in the lower portion of the cantilever are removed. Hence, a (multi-) probe drive mechanism so arranged that the cantilever having a micro-tip at the front portion thereof and the processing circuit are formed on the same substrate 1 is formed as shown in FIG. 7 (f). FIG. 7 (f) illustrates a state where an nMOS drain 12 of the processing circuit and the electrode 9 for driving the cantilever are connected to each other.

Figure 8:
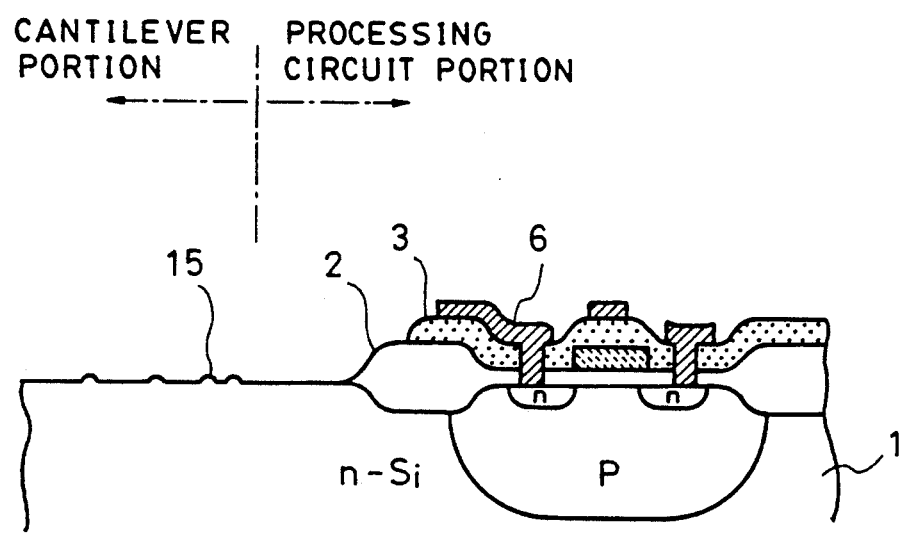
FIG. 8 illustrates hillock generated by the manufacturing method shown in FIG. 7.

However, the aforesaid method in which the unnecessary interlayer insulating layer and the electrode positioned in the cantilever region are sequentially removed encounters a fact that the electrode made of Al or an Al-Si alloy for used as the material for the electrode is positioned in direct contact with Si, which is the substrate. It leads to a fact that Al, which is the material of the electrode, and Si are partially eutectic-reacted with each other after the electrode layer has been formed. Therefore, high density hillock 15 having a size of several mm and a height of thousands of Å as shown in FIG. 8 is left after the electrode material has been removed (corresponding to a state shown in FIG. 7 (c)). Therefore, problems arise in that the piezoelectric layer grows excessively, the driving electrodes are undesirably electrically connected to each other or the wires are disconnected after the cantilever has been formed.

The present invention is so arranged that the direct contact between the Si of the substrate and the electrode material, which will cause the hillock, is prevented, so that a manufacturing method capable of overcoming the aforesaid problems is provided.

Then, the present invention will now be described in detail with reference to examples. However, the present invention is not limited to the following examples.

EXAMPLE 1

FIG. 1 is a cross-sectional view, which illustrates a probe drive mechanism which is obtained by the manufacturing method according to the present invention and in which the cantilever and the processing circuit are formed on the same substrate.

The manufacturing process is composed of the process of forming the processing circuit portion, an ensuing process of forming the cantilever portion, a process of forming a micro-tip, and a process of removing the substrate. Then, the aforesaid processes will now be sequentially described.

As the device for the circuit portion, a CMOS transistor is used. However, only the NMOS portion is illustrated here for the purpose of simplifying the description. As the substrate 1, an n$^-$ type (100) silicon having a resistivity of 1 to 2 Ωcm is used, and a thermally oxidized film layer 21 having a thickness of 7000Å is formed to serve as an implant mask layer by using an oxidizing furnace. Then, a P well region 22 is removed, a thermally oxidized film having a thickness of 1000Å is formed to serve as a buffer layer by an oxidizing furnace. An ion implant device is used to implant B (boron) ions and a heat treatment at 1150° C. is performed for 85 minutes by using a diffusion furnace so that the P well region 22 is formed (see FIG. 2 (a)). Then, the thermally oxidized film layer 21 is removed from the entire surface and a thermally oxidized film is newly formed to a thickness of 500Å, and then an LPCVD (low pressure CVD) device is used to form a 2000Å silicon nitride film. Then, the silicon nitride film in the portions except for the region in which the NMOS, PMOS cantilever will be formed is removed. Then, a resist process is performed, and then P (phosphorus) ions are implanted for stopping the P channel. Similarly, B (boron) ions are implanted for the purpose of stopping the N channel after the resist process has been completed. By using an oxidizing furnace, a thermally oxidized film serving as the first insulating film is formed to a thickness of 8000Å, so that a LOCOS (Local Oxidation of Silicon) layer 2 is formed. Then, the silicon nitride film and the oxidized films except for the LOCOS layer 2 are removed, so that a state shown in FIG. 2 (b) is realized. Then, the oxidizing furnace is used to form a thermally oxidized film to a thickness of 350Å, a gate film layer 23 is formed, and BF$_2$ ions are implanted to the overall surface for the purpose of controlling Vth of the MOS. By using the LPCVD device, a poly-silicon film is formed to have a thickness of 4500Å and by using the implant device the phosphorus ions are implanted to the entire surface. Then, the poly-silicon on the reverse side is removed and annealing is performed at 950° C. for 30 minutes in the diffusion furnace before the poly-silicon film is patterned and etched. Then, the poly-silicon film is oxidized to form a gate electrode 4, so that a state shown in FIG. 2 (c) is realized.

Then, the resist is patterned and arsenic ions are implanted so that the source and drain 12 of the NMOS transistor are formed. Similarly, the resist is patterned and BF$_2$ ions are implanted so that the source and the drain of a PMOS transistor are formed. Then, annealing is performed at 1000° C. for 5 minutes in the diffusion furnace, and a BPSG (boron, phosphorus dope silicon oxidized film) film is formed to a thickness of 7000Å so that an interlayer insulating layer 3 serving as a second insulating layer is formed. Then, annealing at 950° C. for 20 minutes is performed, so that a state shown in FIG. 2 (d) is realized.

In order to establish a contact between the transistor in the circuit portion and the electric line, patterning is performed so as to remove the BPSG layer 3 and the gate layer 23 and to form a contact hole 19 (see FIG. 2 (e)). By using a sputtering device, an aluminum-silicon film is formed (see FIG. 2 (f)), and patterning and etching are performed so that the wiring layer (electrode layer) 6 is formed (see FIG. 2 (g)). Then, the BPSG layer 3 and the gate film layer 23 in the cantilever region are removed so that a state shown in FIG. 2 (h) is realized. Furthermore, a plasma CVD device is used to form SiON films to respectively have thicknesses of 3000Å, 5000Å, 7000Å and 12000Å before they are patterned. As a result, a protection layer 7 is formed (see FIG. 2 (i)). Incidentally, Si$_3$N$_4$ or SiO$_2$ may be used as the material for the protection layer. The reason why several types having protection layers of different thicknesses are formed lies in that the cross talk taking place due to the parasitic capacity between the electrodes of the cantilever and the passivation characteristics of the protection layer of the circuit portion depending upon the thickness of the protection layer must be evaluated.

Then, the layers to be stacked to form the cantilever will now be described. As the lower electrode layer 9, a chrome film is formed to have a thickness of 20Å by using an evaporating device and a gold film having a thickness of 1000Å is formed by a lift off method. Then, the sputter device is used to form a zinc oxide layer to have a thickness of 5000Å to serve as a piezoelectric member layer 8, and then a gold layer is formed to a thickness of 2000Å and a zinc oxide layer is formed to a thickness of 3000Å by the lift off method. Then, a gold layer is formed to a thickness of 1000Å so that the cantilever portion is formed by stacking and a bimorph structure composed of the electrode layer 9 and the piezoelectric member layer 8 is formed (see FIG. 2 (*j*)).

Then, the electrode of the cantilever portion and the electrode of the circuit portions are connected to each other by partially removing the piezoelectric member layer 8 and the protection layer 7 by etching. Furthermore, a contact hole is formed and an aluminum film is formed by the lift off method so that a connecting electrode layer 10 is formed. Then, a micro-tip 11 is formed to a height of 7 μm by a method in which the resist opening portion is used. Incidentally, the necessity of forming the aforesaid micro-tip can be eliminated in the process of manufacturing the cantilever drive mechanism.

As the material of the micro-tip 11, it is preferable that noble metal such as Au, Pt, and Pd be used. Furthermore, it is preferable that the material of the piezoelectric member layer be material such as AlN, ZnO, $Ta_2O_3$, $PbTiO_3$, $Bi_4Ti_3O_{12}$, $BaTiO_3$ and $LiNbO_3$ having a piezoelectric characteristic.

Finally, the silicon substrate 1 below the cantilever is removed by anisotropic etching and then the protection layer is removed by the plasma device (see FIG. 2 (*k*)), so that a probe drive mechanism as shown in FIG. 1 and arranged so that the cantilever and the processing circuit are formed on the same substrate.

Since the cantilever and the processing circuit can be integrally formed according to this embodiment, the size of the multi-probe drive mechanism can be reduced. Furthermore, in the case where the thickness of the protection layer is made to be 3000Å and preferably 5000Å, the cross talk between the electrodes of the cantilever and the channel can be prevented and also the passivation characteristics can be improved. In addition, since the structure is so arranged that the electrode layer 6 of the circuit portion is not positioned in contact with the silicon substrate, the generation of the hillock in the cantilever region due to the alloy forming of aluminum and silicon can be prevented. Therefore, electrical short circuits, disconnections and excessive growth of the piezoelectric member can be prevented, therefore causing a satisfactory effect to be obtained.

EXAMPLE 2

This example is so arranged that a LOCOS layer is formed in place of the gate film layer and the BPSG layer in the lower layer of the electrode layer in the circuit portion in the cantilever region according to Example 1.

FIG. 3 (*a*) illustrates an NMOS transistor in the circuit portion and the cantilever region in a state where the electrode layer in the circuit portion has not been formed. This example is so arranged that the cantilever region is covered with the LOCOS layer. After the electrode layer 6 has been formed (see FIG. 3 (*b*)), the LOCOS layer in the portion, in which the cantilever is formed, is removed (see FIG. 3 (*c*)). The ensuing processes are performed similarly to Example 1, so that a probe drive mechanism according to the present invention and as shown in FIG. 3 (*d*) is obtained.

Also the probe mechanism according to this example enables a satisfactory effect to be obtained similarly to Example 1.

EXAMPLE 3

Figure 4:
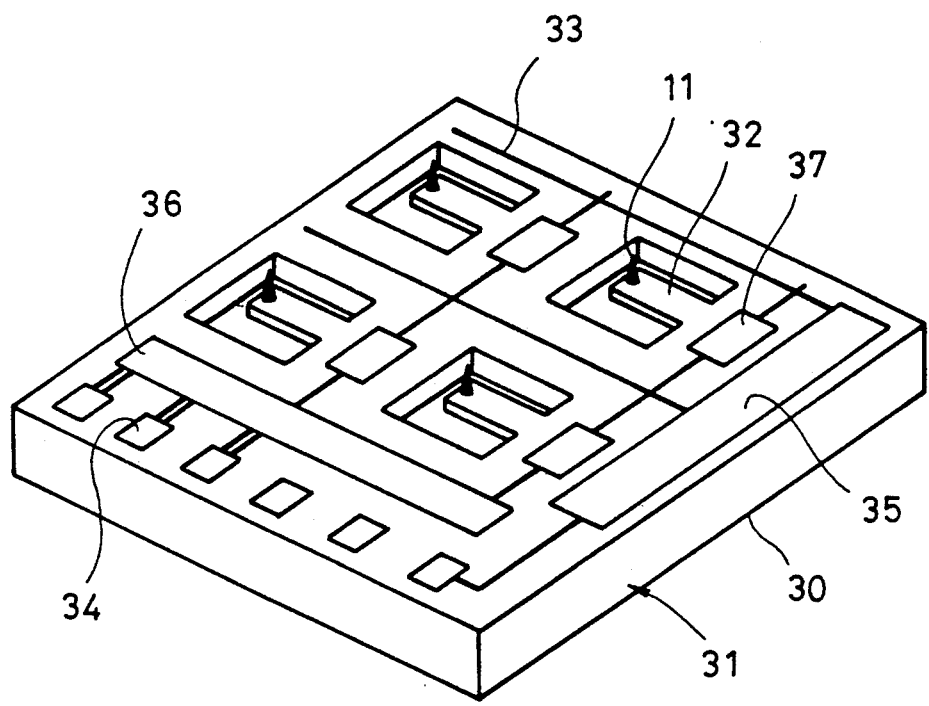
FIG. 4 illustrates a multi-probe head integrally formed on the silicon substrate by the manufacturing method according to the present invention.

With reference to this example, the description will be made about an information processing apparatus which uses the multi-probe drive mechanism obtained by the manufacturing method according to the present invention. Referring to FIG. 4, the aforesaid multi-heads 31 and the peripheral circuit are formed on the same substrate, the substrate being a silicon substrate 30. The information processing apparatus further comprises an X-shift register 35, a Y-shift register 36, a circuit portion 37 including an electrostatic capacity, a switching device and an amplifier, a micro-tip 11, a cantilever 32 and a matrix circuit 33 and the like.

Reference numeral 34 represents a bonding pad for connecting a signal line, the bonding pad being disposed on one side of the multi-probe heads 31 and on each of the two opposite sides. Hence, the recording medium can be moved in a direction running parallel to the bonding pad to perform the recording and/or reproducing operation.

Although the example shown in FIG. 3 is arranged so that the drive device is integrally formed by using the silicon substrate, the present invention is not limited to the silicon substrate. A wafer formed due to the epitaxial-growth of a silicon thin film on a sapphire substrate may be used. Furthermore, semiconductor layers and substrates such as a polysilicon thin film allowed to grow on a quartz substrate and a solid phase epitaxial film may be used regardless of the form thereof.

Figure 5:
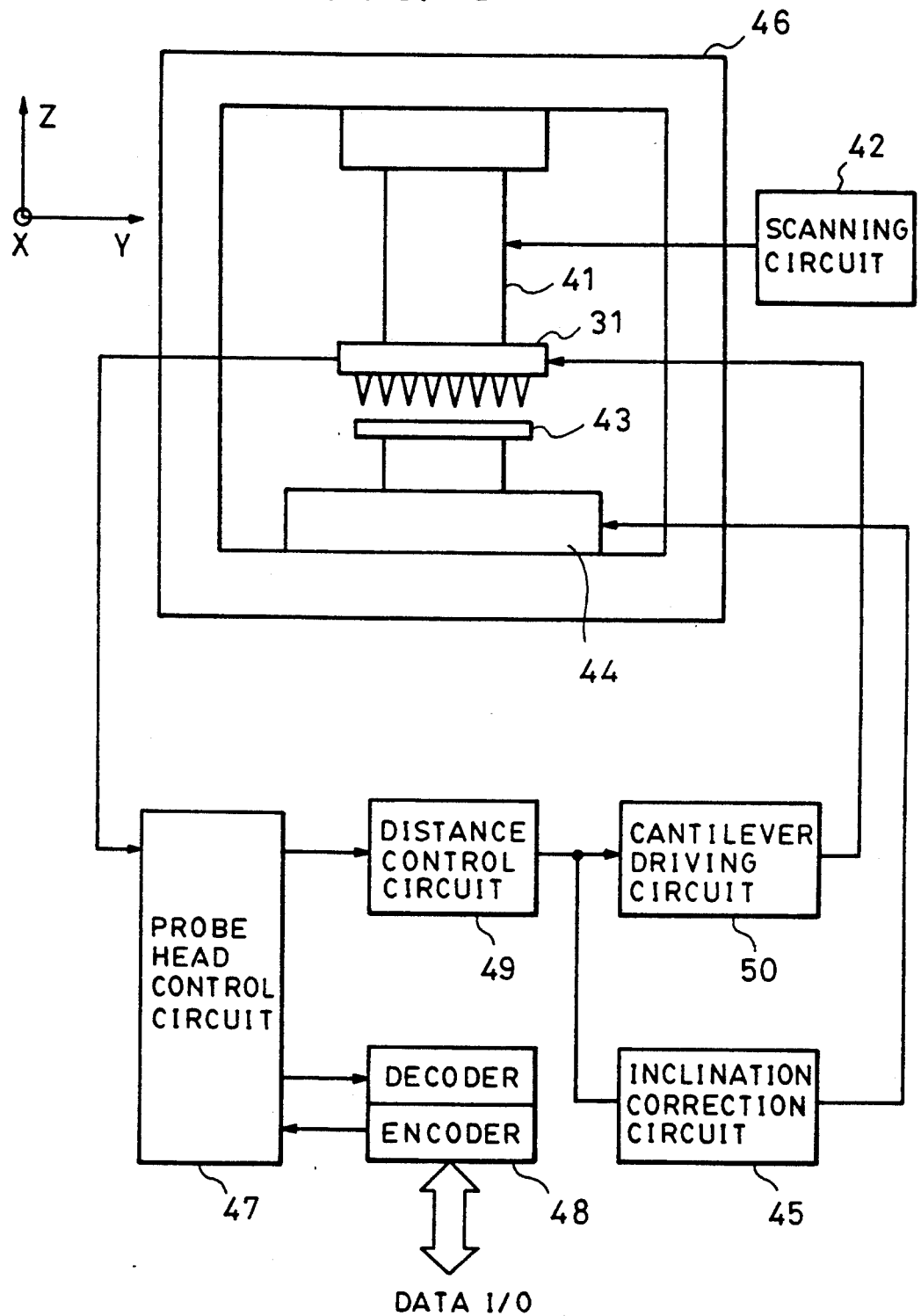
FIG. 5 is a block diagram which illustrates an information processing apparatus which uses the multi-probe head obtained by the manufacturing method according to the present invention.
Figure 6:
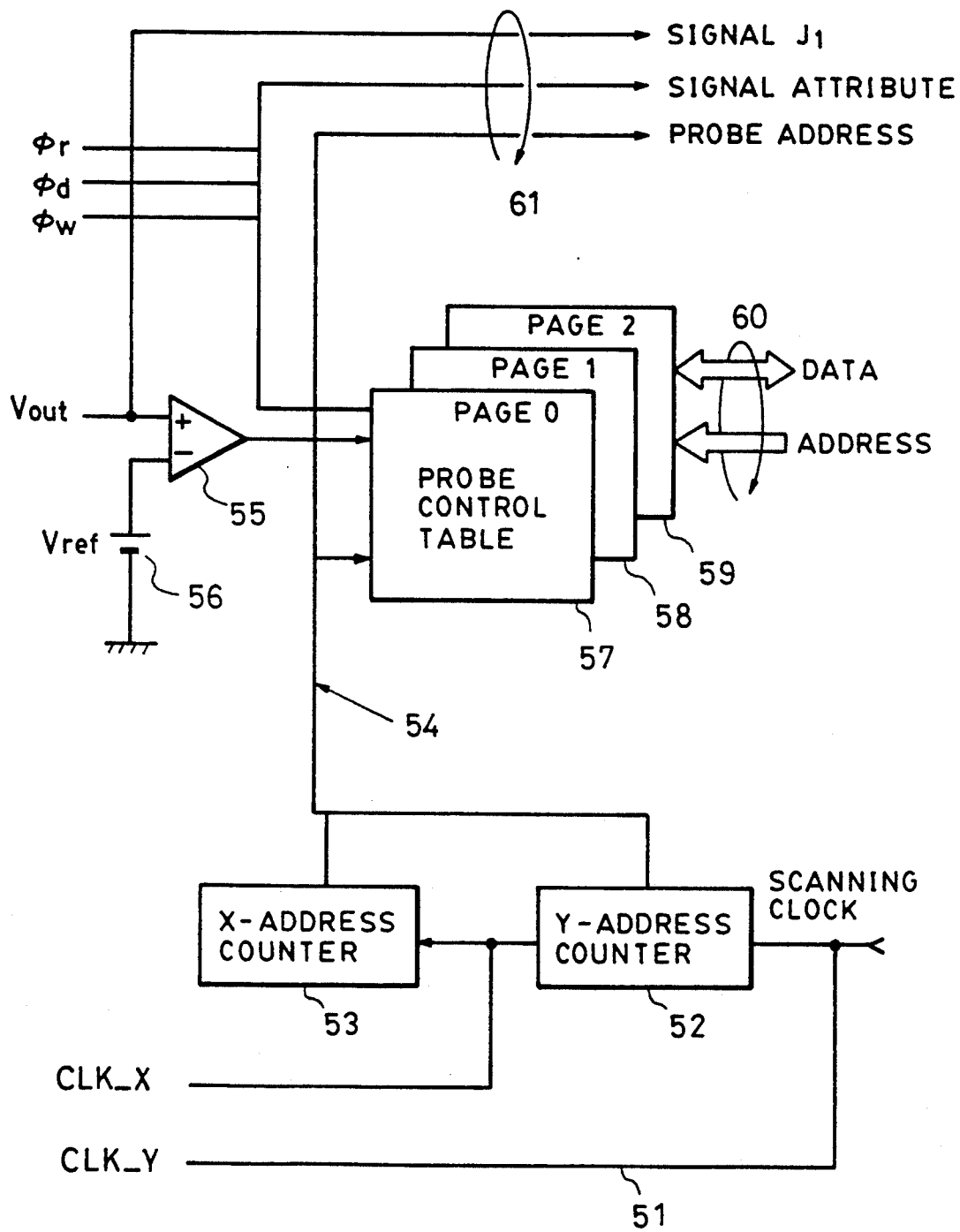
FIG. 6 is a detailed block diagram which illustrates the probe head control circuit shown in FIG. 4.
Figure 7A:
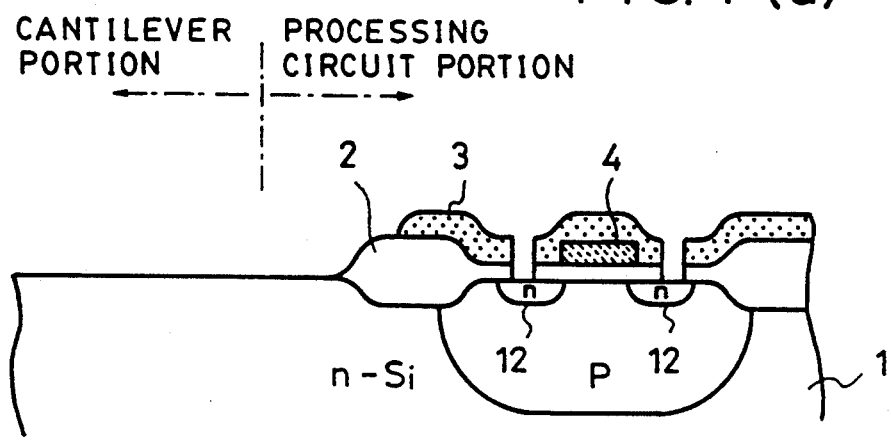
FIGS. 7 (a) to 7 (f) are cross-sectional views which illustrate a manufacturing method to be subjected to a comparison with the present invention.
Figure 7B:
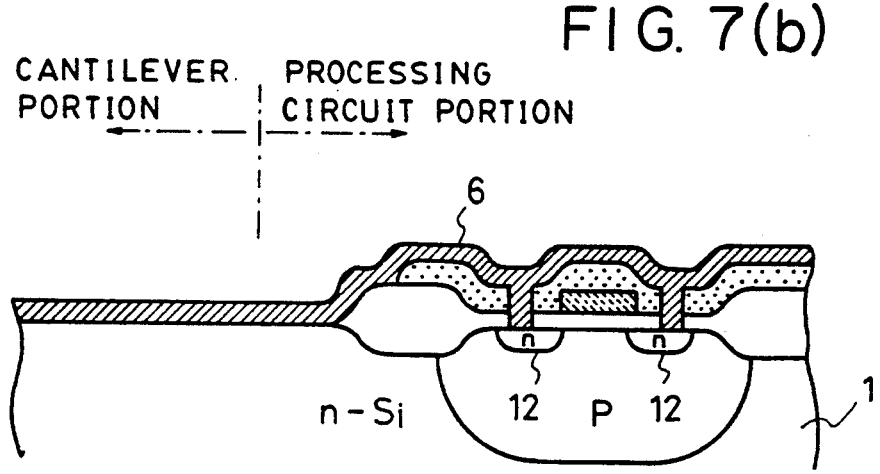
Figure 7C:
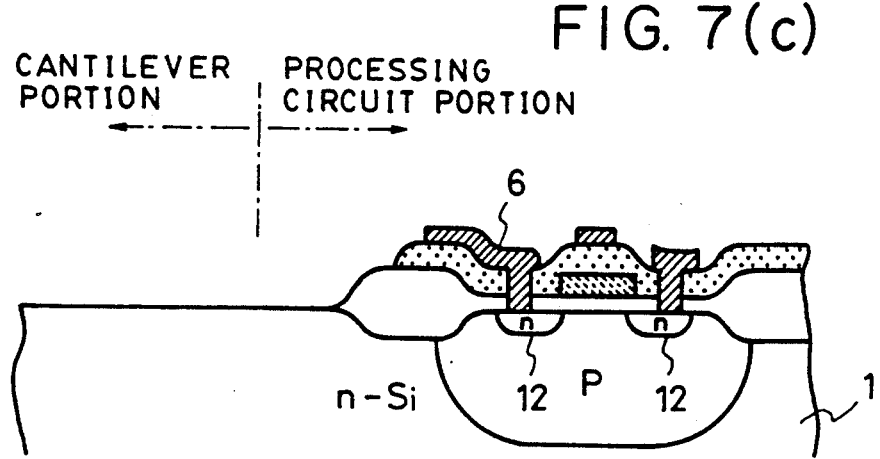
Figure 7D:
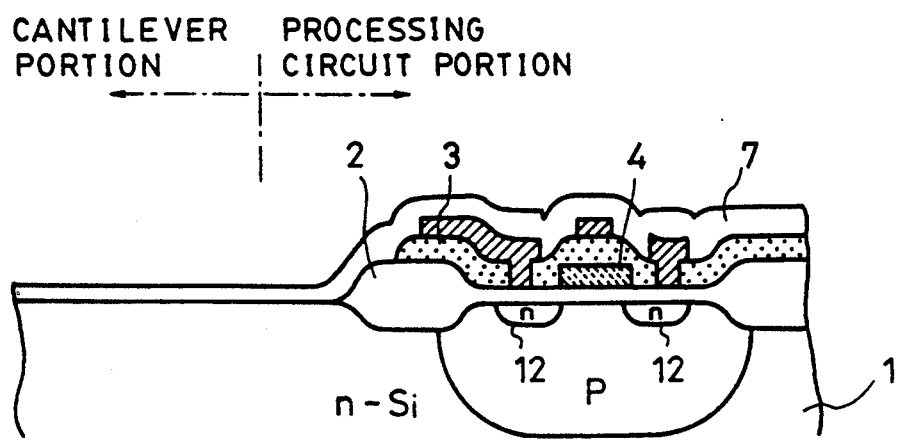
Figure 7E:
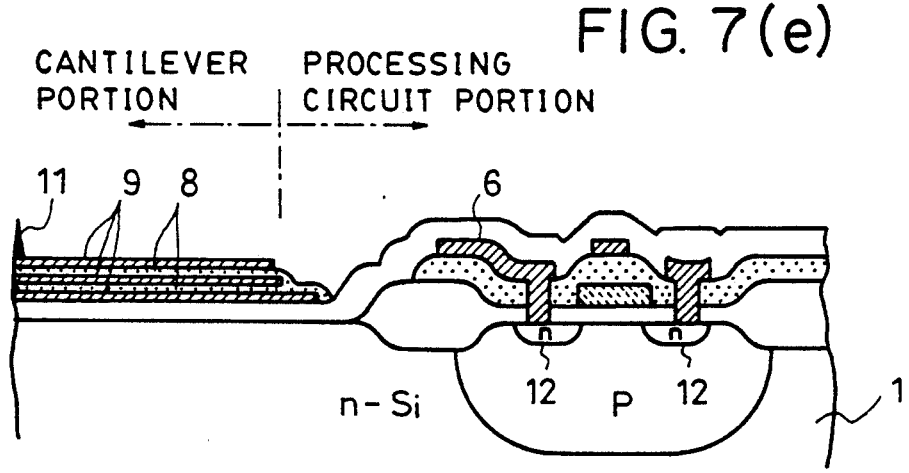
Figure 7F:
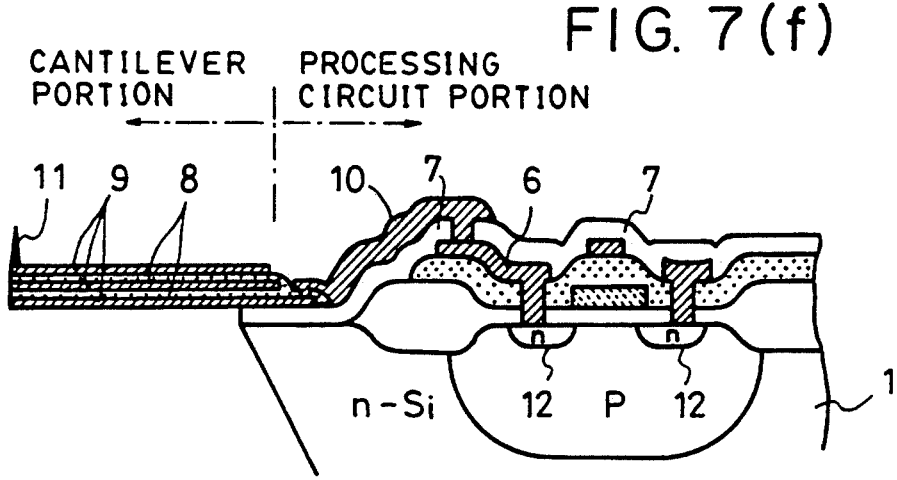
Figure 11:
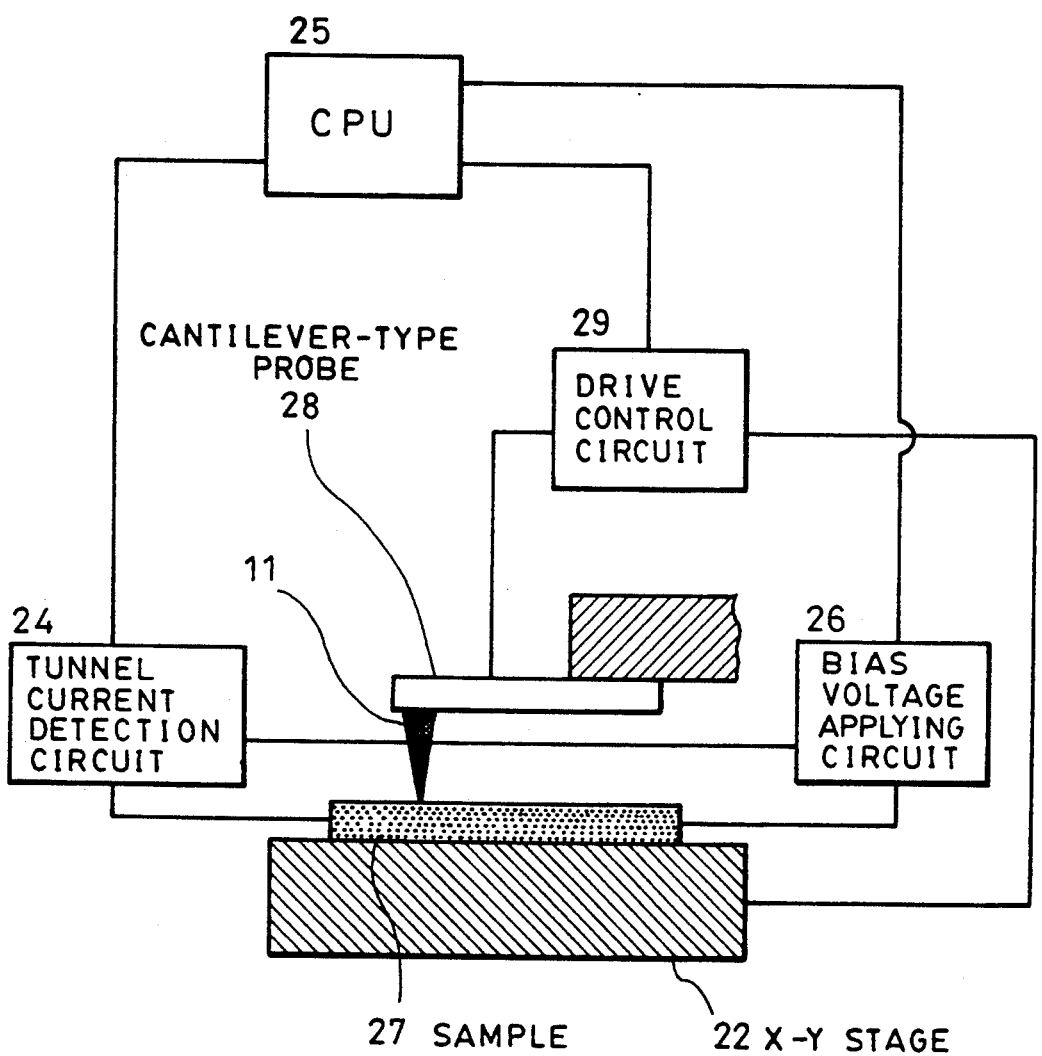
FIG. 11 is a block diagram which illustrates a scan type tunnel microscope to which the probe mechanism according to the present invention is applied.
Figure 12:
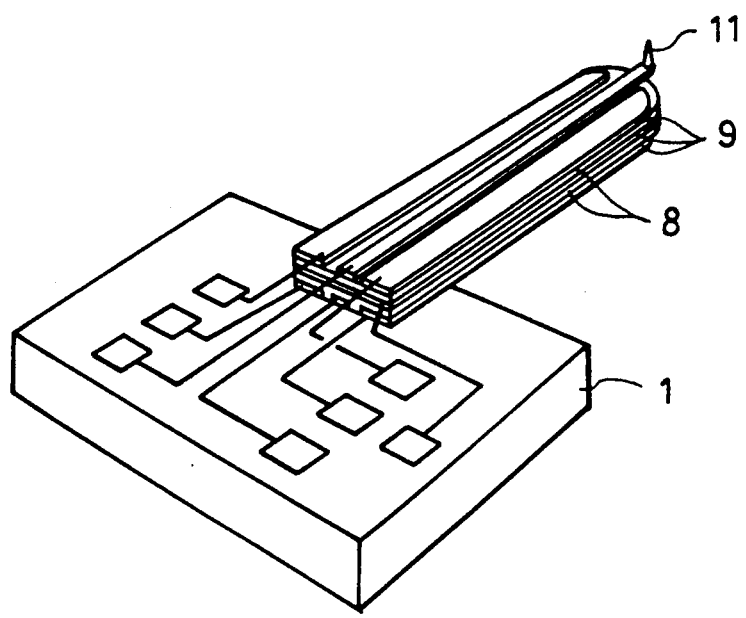
FIG. 12 is a perspective view which illustrates a conventional cantilever probe.
Figure 13:
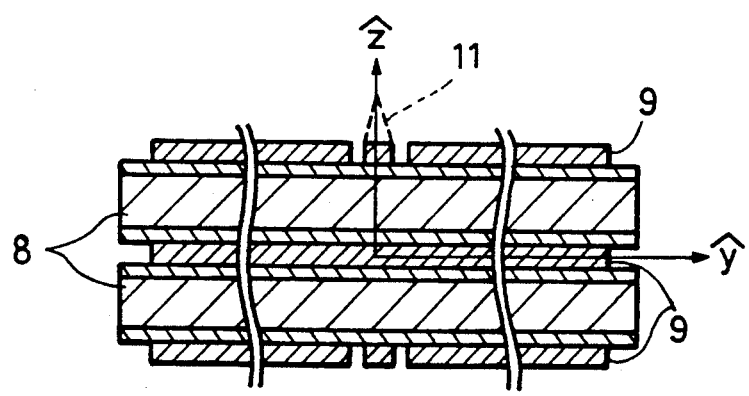
FIG. 13 is a cross-sectional view which illustrates a cantilever portion shown in FIG. 12.

FIG. 5 is a block diagram which illustrates the information processing apparatus having the probe drive mechanism obtained by the manufacturing method according to the present invention. Each of the elements shown in block outline in FIG. 5, as well as in FIGS. 6 and 11, is well known per se, and a specific type of construction is not critical to carrying out the invention or to a disclosure of the best mode for carrying out the invention. Reference numeral 31 represents a multi-probe head, 41 represents an actuator for scanning the multi-probe head in the XY plane, and 42 represents a scanning circuit. Reference numeral 43 represents a recording medium, 44 represents an actuator for correcting the inclination of the recording medium so as to cause the micro-tips of the multi-probe head to be disposed equally, and 45 represents an inclination correction control circuit. Reference numeral 46 represents a structural member for supporting the aforesaid elements.

A recording medium preferably used in the present invention comprises a recording layer on an electrode, which exhibits electrical memory effect, as disclosed in Japanese Patent Laid-Open Application No. 63-161552 or No. 63-161553.

As the above-mentioned recording layer, it becomes possible to use a material having the memory switching phenomenon (electrical memory effect) in the current-voltage characteristics, for example, an organic monomolecular film or its built-up film (LB film) having molecules having the group having only the conjugated π electron level and the group having only the σ electron level in combination laminated on the electrode. The electrical memory effect enables transition (switching) reversible to the low resistance state (ON state) and the high resistance state (OFF state) by applying a voltage exceeding the threshold value capable of transition of the above-mentioned organic monomolecular film or its built-up film, etc. to the states exhibiting 2 or more different electroconductivities under the state arranged between a pair of electrodes (ON state, OFF state). Also, the respective states can be retained (memorized) even when application of the voltage may be stopped.

The control of the multi-probe head 31 is performed by a probe head control circuit 47. Data to be written is encoded by an encoder 48 before it is transferred to a probe head control circuit 47. As a result, the multi-probe head 31 is driven so that data is written to the recording medium. When data is read, an address to be read is generated by a processor (omitted from illustration) and the probe head control circuit 47 is driven. The probe head control circuit 47 reads a signal of each probe from the multi-probe head 31 in accordance with the aforesaid address so as to transfer the signal to the decoder 48. The decoder 48 performs an error detection or error correction from the aforesaid signal before it transmits data.

The control of the distance between probe mediums and that of the inclination of the multi-probe head are performed similarly to the description made above. The probe head control circuit 47 directly reads information about the tunnel current which passes through each probe current. A circuit 49 for controlling the distance between the probe and the medium detects the deviation from the reference position. The Z-directional control of each micro-tip is controlled by a cantilever drive circuit 50. In a case where the attitude of the multi-probe head must be corrected, the inclination control circuit 45 is used.

FIG. 6 is a detailed block diagram which illustrates the probe head control circuit 47 for writing and/or reading data.

The timing for accessing each probe electrode is controlled on the basis of a scanning clock 51. The aforesaid scanning clock is made to be clock signal CLK-Y for the multi-probe head, the clock signal CLK-Y being supplied to a Y-address counter 52. The Y-address counter 52 has the same number of counts as that of the steps of a Y-shift register of the multi-probe head. The carry output from the Y-address counter 52 is made to be clock signal CLK-X of the multi-probe head, the clock signal CLK-X being supplied to an X-address counter 53. The X-address counter 53 has the same number of counts as that of the steps of the X-shift register of the multi-probe head. The count output from the X and Y address counters is made to be a probe address 54.

Read output Vout from the multi-probe head is supplied to a comparator 55. The comparator 55 binary-coding read output Vout while making Vref 56 as the reference voltage. The binary output is written to a recording unit of a probe control table 57 instructed with the probe address 54.

Each of probe control tables 57 to 59 has one to several pages each of which is composed of a temporary storage memory constituted by recording units of the same number as the number of the probes of the multi-probe head. Each recording unit records at least 6 logical values consisting of record data logical value read from the multi-probe head and drive status values for instructing reading, writing on, writing off and deletion operations.

As for the access of the multi-probe head, $\phi r$ (read signal), $\phi d$ (deletion signal), $\phi w$ (write signal) signals are generated so as to control the probe electrode in accordance with the drive status value of each unit of the probe control table.

When data is read by the multi-probe head, the micro-tip is scanned to a predetermined position of the recording medium. Then, a host control CPU (omitted from illustration) is used to register the drive state value to a recording unit which corresponds to the address of the probe which reads data of the probe control tables 57 to 59 via a data bus and an address bus. After the sequence reading operations with the multi-probe head have been completed, the read data logical value of the recording unit of the previously instructed probe address is read, and the error detection or the error correction is performed by the encoder 48. Thus, the reading operation is completed.

When data is written, supplied data is encoded by the encoder 48 before the logical values of the encoding language are, as the drive status value, registered to the probe control tables 57 to 59. In accordance with the registered logical data, writing signals are sequentially transferred to the multi-probe head.

Each of the recording units does not continuously register the writing or the deletion operations with respect to an access cycle for each page. That is, each micro-tip does not continuously permit the writing operations but the writing and deletion are performed while performing the reading operation without exception. The aforesaid arrangement is required to control the distance between the probe electrode and the recording medium in accordance with the amplitude of the signal at the time of the reading operation.

Furthermore, writing or deletion registration is not performed with respect to all of the recording units in one page. That is, all of the matrix-disposed probe electrodes of the multi-probe head do not simultaneously perform the writing operation. The aforesaid arrangement is required to control the inclination to always hold the multi-probe head to run parallel to the recording medium.

The Z-directional control of the micro-tip and the control of the inclination of the probe head are performed by the circuit 49 for controlling the distance between the probe and the medium by using the signal attribute generated from tunnel current equivalent signal Jt generated from the signal Vout and signals $\phi r$, $\phi d$ and $\phi w$ and a probe Z control signal group 61 constituted by the probe address. That is, the circuit 49 for controlling the distance between the probe and the medium makes a reference to the probe control table and drives a cantilever drive circuit 50 and the inclination correction circuit 45 in accordance with the output signal Vout from the probe which is in the reading state.

Incidentally, the cantilever for use in the structure according to this embodiment is arranged to have an electrostatic or a piezoelectric actuator in addition to the probe electrode so that the distance between the probe electrode and the recording medium can be controlled respectively. The aforesaid actuators are driven in response to a signal supplied from the cantilever drive circuit 50 via a circuit (omitted from illustration) provided for the multi-probe head.

By using the write/read control method in which the aforesaid probe control table is used, the location of the probe electrodes to be brought to the reading state can be arbitrarily determined in such a manner that the all of the probe electrodes have an equal writing and reading ratio. As a result of the aforesaid control, the Z-directional control of the probe can be stably performed at high speed regardless of writing and deletion data.

As described above, the manufacturing method according to the present invention enables a probe mechanism to be obtained in which integration can be realized efficiently while maintaining the drive characteristics of the cantilever and the tunnel current detection characteristics and as well as reducing the parasitic capacity generated between the electrodes of the cantilever.

Furthermore, an STM and an information processing apparatus can be provided which is capable of stably recording and/or reproducing information at high speed while reducing the size thereof.

Although the aforesaid example employs the cantilever having a bimorph structure provided with an intermediate electrode, a further preferable example in which a cantilever having no intermediate electrode will now be described.

A cantilever of the aforesaid type is a thin film cantilever which can be formed into a multi-cantilever and integrated, which has a large quantity of displacement equivalent to that of the conventional cantilever comprising the piezoelectric bimorph structure having an intermediate electrode, which is capable of easily controlling the stress of each of the stacked layers, which is capable of preventing generations of cracks in the film and separation of the film, and which can be manufactured by a simple manufacturing process.

For example, the description will be made with reference to FIG. 9 (c). In a case where an electric field is applied to a portion between a lower electrode 9-1 and an upper electrode 9-2, a phenomenon takes place in that either of a first piezoelectric thin film layer 8-1 or a second piezoelectric thin film layer 8-2 is displaced in the extending direction and the residual layer is displaced in the contraction direction though the same electric field is applied because the polarization direction of the first piezoelectric thin film layer 8-1 is different from that of the second piezoelectric thin film layer 8-2. Therefore, the free end of a cantilever type displacement device can be displaced upwards or downwards a considerable amount. Furthermore, an intermediate layer 8-3 formed continuously from the layers 8-1 and 8-2 and having a different polarization direction from that of the layer 8-2 is present in the interfacial surface between the piezoelectric thin film layer 8-1 and 8-2, and the adhesion between the layers 8-1 and 8-2 can be improved. As a result of the aforesaid structure, the intermediate electrode can be omitted from the structure, causing a portion in the interface between the electrode and the piezoelectric member in which the stress will be generated to be reduced. Furthermore, the generation of the stress in the interface between two piezoelectric thin films having different polarization directions can be substantially prevented because the same material is used and therefore the two layers have the same crystal lattice and substantially the same thermal expansion coefficient. As described above, the internal stress present on the interface can be minimized. In addition, since the adhesive layer is not present between the piezoelectric members, satisfactory durability against repeated displacement can be realized.

That is, the cantilever-like displacement device according to the present invention enables the intermediate electrode to be omitted from the conventional cantilever comprising the piezoelectric bimorph. Therefore, the stress control between the piezoelectric thin films can be easily performed and a problem of the separation of the film in the interface can be overcome. Furthermore, the generation of the cracks in the piezoelectric film can be prevented. As a result, a thin film cantilever type displacement device which can be formed into a multi-cantilever structure, which can be integrated, and which exhibits satisfactory durability against repeated displacement and a cantilever-type probe which uses the aforesaid cantilever can be stably provided by a simple manufacturing process.

In order to describe the present invention in detail, the process of the study to establish the present invention will now be described.

Experiment: Stacking Layers Having Different Polarization Directions and Forming of Piezoelectric Displacement Device Description will now be made about an experimental example in which piezoelectric thin films composed of two layers having different polarization directions are continuously stacked and the stacked piezoelectric thin film is used to manufacture the thin film cantilever type displacement device according to the present invention.

The process of forming the circuit portion (see FIG. 1 (i)) was performed similarly to Example 1. Then, as shown in FIG. 9 (a), the lower electrode 9-1 was formed on the protection layer 7. The substrate 1 was made of Si, the protection layer 7 was made of SiON, and the lower electrode 9-1 was formed by a Cr/Au stacked film by an ordinary resistance hot evaporation process.

Figure 9:
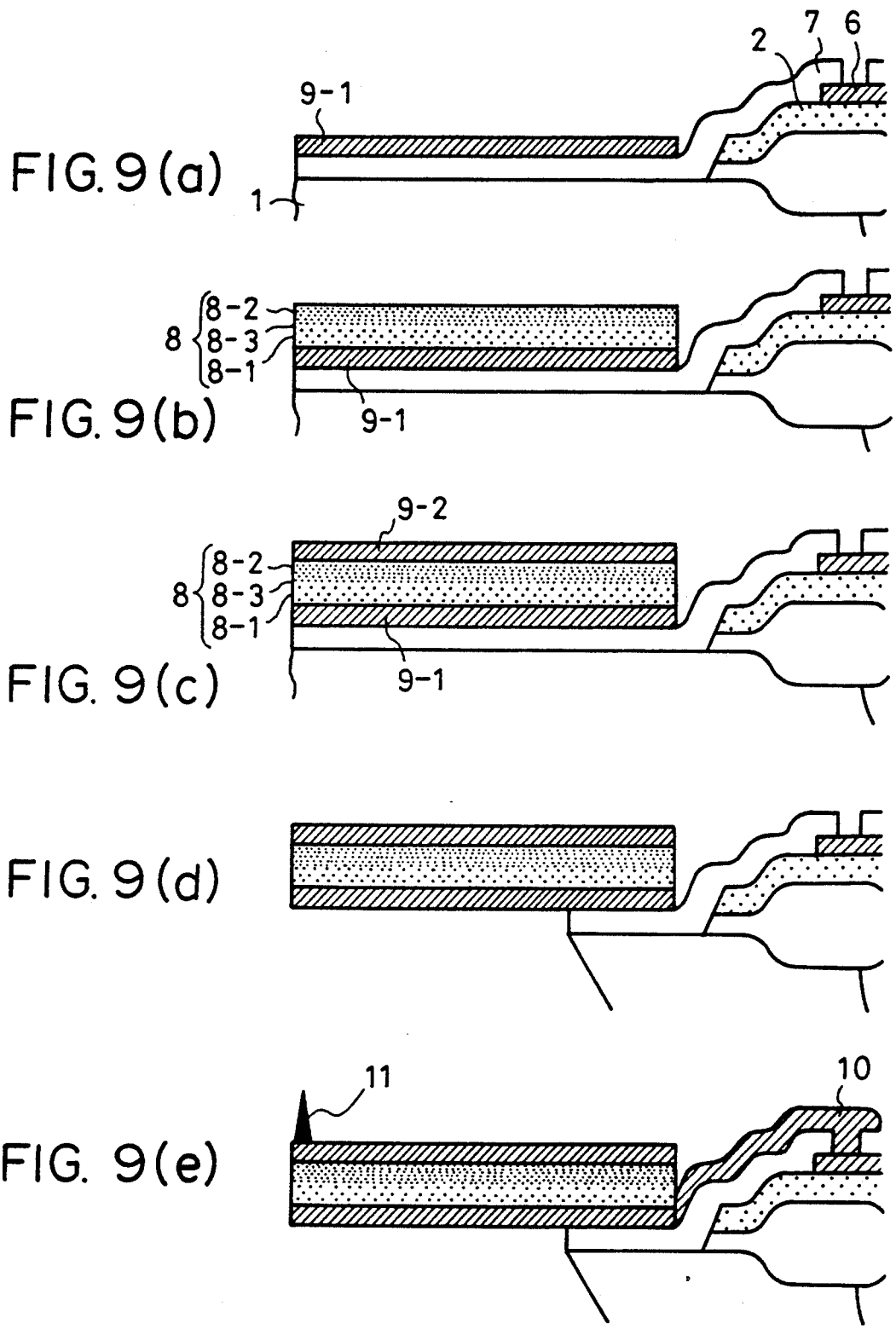
FIGS. 9 (a) to 9 (e) are cross-sectional views which illustrate the process of manufacturing a cantilever portion according to the present invention.

As shown in FIG. 9 (b), the piezoelectric thin film 8 was formed by continuously stacking and depositing the first piezoelectric thin film layer 8-1, the intermediate layer 8-3 and the second piezoelectric thin film layer 8-2. At this time, an ion beam evaporation device shown in FIG. 10 was used in such a manner that the raw material of the thin film was injected into an evaporation source 69 and it was evaporated by heat. Furthermore, the film was formed in such a manner that the ionizing current and the accelerating voltage were made different between the first piezoelectric thin film layer 8-1 and the second piezoelectric thin film layer 8-2 while spraying a reactive gas introduced through a gas injection port 65 to the surface of the substrate.

First, the first layer 8-1 was deposited while making the ionizing current and the accelerating voltage to be suitable levels under the aforesaid film forming conditions. Then, the ionizing current was instantaneously increased while continuing the evaporation, and the film forming operation was continued while reversing the polarity of the accelerating voltage, so that the second layer 8-2 was deposited while intervening the intermediate layer 8-3.

Then, the upper electrode 9-2 was formed by evaporating Au by the ordinary resistance hot evaporation process as shown in FIG. 9 (c).

After the lower electrode 9-1, the piezoelectric thin film 8 and the upper electrode 9-2 had been stacked as described above, the displacement device was manufactured by performing patterning into the cantilever shape as shown in FIG. 9 (d). The patterning process was performed by using the photoresist, dry etching was performed by using a reactive ion etching device, and the resist was separated. Then, the substrate was subjected to the anisotropic etching process by using a potassium hydroxide solution so that an end portion of the device was removed together with the protection layer 7 and the substrate in the lower portion of the device was also removed. Thus, the device was manufactured.

When a positive electric field was applied to the upper electrode 9-2 after the lower electrode 9-1 of the thus manufactured cantilever type displacement device was grounded, the free end of the device was upwardly displaced. When a negative electric field of the same intensity was applied to the same, the free end was displaced downwardly by the same degree.

As described above, the cantilever type displacement device according to the present invention is manufactured as shown in FIG. 9 in such a manner that the lower electrode 9-1, a piezoelectric thin film 8 composed of a plurality of layers having different polarization directions, that is, the first layer 8-1, the intermediate layer 8-3 and the second layer 8-2, and the upper electrode 9-2 are deposited on the substrate 1 while intervening the protection layer 7 before patterning is performed, and the substrate in the lower portion of the device is removed except for the one end portion of the device. The process of patterning the device portion is performed by combining the photolithography by using an ordinary photoresist, dry etching such as the reactive ion etching, and wet etching by using oxide or alkali etching liquid.

If a suitable etching method cannot be adapted to the electrode, the lift off process is employed. The removal of the substrate in the lower portion of the device is performed by anisotropy etching of the substrate. In an ordinary case where Si is used, a typical method in which an $Si_3N_4$ layer is used to serve as a mask layer which is then patterned, and potassium hydroxide solution is used can be employed.

The cantilever type probe which uses the aforesaid displacement device can be manufactured as shown in FIG. 9 (e) in such a manner that the micro-tip 11 for input and/or output information is provided at the free end of the device and the circuit portion and the electrode of the cantilever portion are brought into contact with each other. The information processing apparatus which uses the aforesaid cantilever type probe utilizes the principle of the STM and performs recording and reproducing by means of the tunnel current which passes between the probe and the recording medium. The block diagram of a typical apparatus is shown in FIG. 11. In accordance with the same principle and the same method, the surface observation can be performed by the STM.

The thin film material for use to form the piezoelectric thin film 8 is not limited particularly if the material has the piezoelectric characteristics and performs the spontaneous polarization, the material being exemplified by AlN, ZnO, $Ta_2O_3$, $PbTiO_3$, $Bi_4Ti_3O_{12}$, $BaTiO_3$, $LiNbO_3$ and the like.

The method manufacturing the piezoelectric thin film 8 is not limited particularly. For example, the evaporation method including the aforesaid ion beam evaporation method, the sputtering method, the CVD method, or the sol and gel method may be employed. Furthermore, an assist means such as plasma, active gas and/or light irradiation may be combined in addition to the aforesaid film forming method.

Although the method of controlling the polarization direction of the thin film at the time of depositing the piezoelectric thin film depends upon the method of forming the thin film, the following means are schematically exemplified to correspond to the employed method.

(1) Evaporation Method (Ion Beam Evaporation Method Included)

Control of the ionizing current and accelerating voltage (the ionizing current is made to be a suitable value selected from a range from 0 to 500 mA, and the accelerating voltage is made to be a suitable level selected from a range from $-10$ kV to $+10$ kV)

Exchange of evaporation material (metal ⟷ compound)

(2) Sputter Method

Exchange of target material (metal ⟷ compound)

(3) CVD Method

Type of the raw material gas, and the like

Methods of controlling the polarization direction of the thin film commonly employed to a multiplicity of thin film manufacturing methods are exemplified as follows:

change of the temperature of the substrate doping of different element to the piezoelectric thin film control of the assist condition (plasma, active gas, light irradiation)

application of a bias electric field to the substrate control of the state of the base of each layer The aforesaid control methods may be employed while being combined in a place of sole employment. Furthermore, it may be used between the layers or temporarily used after the film has been formed as well as continuously used in the entire process of depositing the piezoelectric thin film. That is, for example as shown in FIG. 9 (b), the first layer 8-1 is deposited and then the crystal state of a predetermined thickness of the first layer 8-1 is temporarily changed by plasma irradiation, and then the second layer 8-2 is deposited under the same conditions as those for forming the first layer 8-1, so that the following structure can be, for example, realized that the polarization direction of the initial stage of the forming process is made to be opposite to that of the first layer 8-1 and the polarization direction of the overall body of the second layer 8-2 is made to be opposite to that of the first layer 8-1.

As the material used to form the lower electrode 9-1 and the upper electrode 9-2, it is preferable that noble metals such as Au, Pt and Pd be used. Al or the like may be used as the electrode material in a case where AlN or ZnO is used as the material for forming the piezoelectric thin film 8, and can be formed when the temperature of the substrate is at a relatively low level, is used. Furthermore, a conductive oxide such as ITO may be used. In any case, a proper contact layer may be used in order to improve the adhesion with the piezoelectric thin film 8. It is exemplified by Cr layer in the Cr/Au stacked film for used in the lower electrode 9-1 in the aforesaid experiment.

Then, the present invention will now be described in detail with reference to examples.

EXAMPLE 4

FIGS. 9 (a) to 9 (e) schematically illustrate the method of manufacturing the cantilever-like displacement device according to this example and a cantilever type probe which uses it.

Referring to FIGS. 9 (a) to 9 (e), reference numeral 1 represents a substrate, 7 represents a protection layer, 9-1 represents a lower electrode, 8 represents a formed piezoelectric thin film composed of a plurality of layers having different polarization directions, that is, a first piezoelectric thin film layer 8-1, an intermediate layer 8-3 and a second piezoelectric thin film layer 8-2. Reference numeral 9-2 represents an upper electrode and 11 represents a micro-tip for inputting and/or outputting information.

Figure 10:
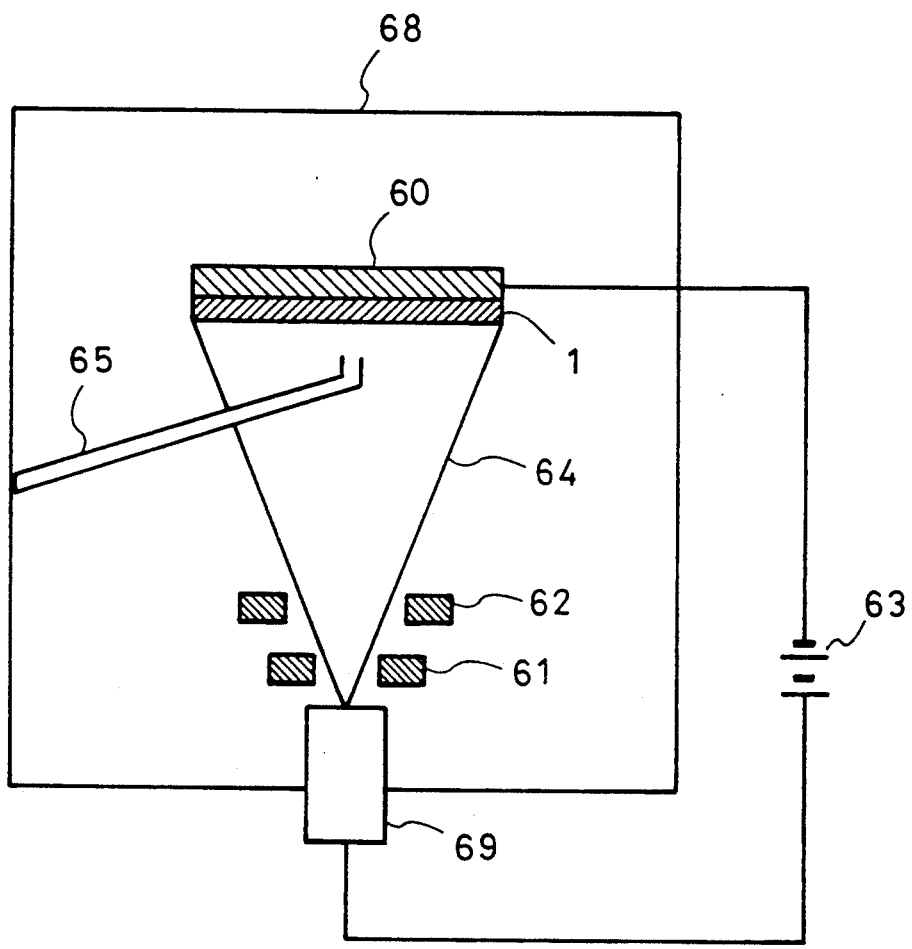
FIG. 10 is a structural view which illustrates an ion beam evaporating device for use to manufacture the cantilever portion according to the present invention.

FIG. 10 is a schematic view which illustrates an example of an ion beam evaporating device for use to stack the piezoelectric thin film 8 of the device according to this example. Referring to FIG. 10, reference numeral 1 represents a substrate, 68 represents a vacuum chamber, 69 represents an evaporation source having a crucible and a heating device, 60 represents a substrate holder, 61 represents an electron emitting source, 62 represents an accelerating electrode, and 63 represents a power source for the acceleration. Although the illustration is so made that the substrate side is made to be negative, the polarity may be reversed. Reference numeral 64 represents a jetted steam ion beam, and 65 represents a gas jetting port.

Incidentally, the vacuum chamber 68 can be exhausted by a device (omitted from illustration). Furthermore, the temperature of the substrate 1, the temperature of the evaporating source 69, the ionizing current to be supplied to the electron discharge source 61 and the gas flow at the gas jetting port 65 can be respectively independently controlled by a device (omitted from illustration).

Then, a method of manufacturing the cantilever-like displacement device according to this example will now be described.

First, the lower electrode 9-1 was formed on the substrate 1 as shown in FIG. 9 (a). As the substrate 1, a (100) Si single crystal was used. The lower electrode was formed by a Pt film manufactured by ordinary high frequency sputtering to be evaporated to have a thickness of 0.1 μm, and then ordinary photolithography was used to perform the lift off process so that the unnecessary portion was removed.

Then, the piezoelectric thin film 8 composed of two layers was continuously formed as shown in FIG. 9 (b). The film forming process was performed by using the ion beam evaporating device shown in FIG. 11. According to this embodiment, ZnO, which is a typical piezoelectric material, was used to form the aforesaid piezoelectric thin film 8. Both of the first layer 8-1 and the second layer 8-2 of the piezoelectric thin film 8 were formed under the same conditions except for the ionizing current and the accelerating voltage.

The vacuum chamber 8 was exhausted to a pressure level of $5 \times 10^{-5}$ Pa or lower, and Zn, which is the raw material of the thin film, was charged into the evaporating source 69 before it was evaporated by heat. Then, an $O_2$ gas was introduced through the gas jetting port 65 at a speed of 12 ml/min. to be sprayed to the surface of the substrate, so that the film was formed. The temperature of the substrate was made to be 200° C.

First, the first layer 8-1 of the piezoelectric thin film 8 was formed to have a thickness of 0.3 μm under the above-described film forming conditions while making the ionizing current to be 50 mA and the accelerating voltage to be 0.5 kV. Then, the second layer 8-2 was consecutively stacked to have a thickness of 0.3 μm under the aforesaid film forming conditions while making the ionizing current to be 100 mA and the accelerating voltage to be −0.5 kV in such a manner that the polarity was reversed.

After the piezoelectric thin film 8 had been formed, the upper electrode 9-2 was, as shown in FIG. 9 (c), formed in such a manner that Pt was evaporated by a thickness of 0.1 μm by the ordinary high frequency sputtering, unnecessary portions of the piezoelectric thin film 8 and the upper electrode 9-2 were removed by the ordinary photolithography as shown in FIG. 9 (d), the potassium hydroxide solution was used to perform the anisotropic etching process to remove the one side portion of the device, and the substrate and the protection layer in the lower portion of the device were removed.

The cantilever-like displacement device manufactured by the method according to this example was 500 μm long and 50 μm wide.

In a case where a voltage of ±3 V was applied to a portion between the lower electrode 9-1 and the upper electrode 9-2 of the thus manufactured thin film cantilever-like displacement device, the leading portion of the cantilever was vertically displaced by ±5 μm when viewed in FIGS. 9 (a) to 9 (e).

The warp of the cantilever portion in a state where no voltage was applied after the cantilever had been formed was 0.5 μm or less when measured at the leading portion. The change in the warp of the cantilever portion taken place when the atmospheric temperature was changed with no voltage applied was very small such that 0.1 μm or less in a temperature range from 0° C. to 100° C. Furthermore, neither cracks were observed nor film separation was found in the film for use to form the device. Furthermore, no defect due to the aforesaid problems was observed in the operation.

Then, as shown in FIG. 9 (e), the cantilever type probe which uses the thus manufactured cantilever-type displacement device was formed in such a manner that the micro-tip 11 for inputting and/or outputting information was formed at the free end of the device and the electrode in the circuit portion and that of the cantilever portion were brought into contact by the electrode layer 10. The micro-tip 11 was formed by adhering metal pieces such as Pt, Rh and W.

Then, an example in which the STM information processing apparatus was manufactured by using the cantilever-type probe according to this example will now be described. FIG. 11 is a block diagram which illustrates the apparatus. After the micro-tip 11 had been allowed to come closer to a sample 27 by a cantilever-type probe 28 manufactured by the method according to this example (in the vertical direction when viewed in FIG. 11), the directions X and Y in the plane of the sample 27 were scanned by an X-Y stage 22. Then, voltage was applied to the micro-tip 11 and the sample 27 by a bias voltage applying circuit 26. The tunnel current to be observed at this time is read by a tunnel current amplifying circuit 24 so as to observe the image. The control of the distance between the sample 27 and the micro-tip 11 and that of the drive of the X-Y stage 22 are performed by a drive control circuit 29.

The sequence control of the aforesaid circuits is performed by a CPU 25. As the mechanism for scanning with the X-Y stage 22, a control mechanism (omitted from illustration) such as a cylindrical piezoelectric actuator, a parallel spring, an operational micrometer, a voice coil and an inch-worm is used.

The aforesaid apparatus was used to observe the surface of the sample 27, which was an HOPG (graphite) plate. The bias voltage applying circuit 26 was used to apply a DC voltage of 200 mV to a portion between the micro-tip 11 and the sample 27. In this state, the micro-tip 11 was used to scan the sample 27 and a signal detected by using the tunnel current detection circuit 24 was used to observe the surface. When the scan area of 0.05 $\mu$m × 0.05 $\mu$m was observed, an excellent image of the atom was obtained.

As described above, the operation to be performed on the basis of the principle of the STM was confirmed and information recording and/or reproducing and surface observation operations were confirmed.

EXAMPLE 5

This example is so arranged that a similar device to that according to Example 4 was used, the material of the piezoelectric thin film 8 was ZnO, the deposition was performed by the sputtering method, the polarization direction between the first layer 8-1 and the second layer 8-2 was reversed by changing the material of the target of the sputtering operation between Zn and ZnO.

Similarly to Example 4, the lower electrode 9-1 is first formed on the protection layer 7 as shown in FIG. 9 (a). As the substrate 1, (100) Si single crystal was used. The lower electrode was formed by using the Pt film by the ordinary sputtering process to be evaporated to have a thickness of 0.1 $\mu$m. Then, the unnecessary portions were removed by the lift off process by ordinary photolithography.

Then, the piezoelectric thin film 8 composed of two layers was continuously formed as shown in FIG. 9 (b). The film forming conditions were made commonly to either target that the temperature of the substrate was 200° C., the sputter gas was a mixture of Ar and $O_2$ at a mixture ratio of 1:1, the gas pressure was 0.5 Pa and the plasma power for performing the sputtering was 200 W.

First, the first layer 8-1 of the piezoelectric thin film 8 was formed under the aforesaid film forming conditions by using an Zn target while making the thickness of the film to be 0.3 $\mu$m. Then, the second layer 8-2 was consecutively formed by stacking to have a thickness of 0.3 $\mu$m under the aforesaid film forming conditions by using an ZnO target.

After the piezoelectric thin film 8 had been formed, the upper electrode 9-2 was, as shown in FIG. 9 (c), formed in such a manner that Pt was evaporated by a thickness of 0.1 $\mu$m by the ordinary high frequency sputtering, unnecessary portions of the piezoelectric thin film 8 and the upper electrode 9-2 were removed by the lift off process of ordinary photolithography as shown in FIG. 9 (d), the potassium hydroxide solution was used to perform the anisotropic etching process to remove the one side portion of the device, and the substrate and the protection layer in the lower portion of the device were removed.

The cantilever-like displacement device manufactured by the method according to this example was 500 $\mu$m long and 50 $\mu$m wide.

In a case where a voltage of ±3 V was applied to a portion between the lower electrode 9-1 and the upper electrode 9-2 of the thus manufactured thin film cantilever-like displacement device, the leading portion of the cantilever was vertically displaced by ±5 $\mu$m when viewed in FIGS. 9 (a) to 9 (e).

Then, similarly to Example 4, the cantilever type probe was formed in such a manner that the micro-tip 11 for inputting and/or outputting information was formed at the free end of the thus manufactured cantilever type displacement device and the electrode in the circuit portion and that of the cantilever portion were brought into contact by the electrode layer 10. By using it, an STM and an information processing apparatus which used the STM were manufactured, resulting in an excellent operation similar to Example 4 to be performed.

EXAMPLE 6

This example is arranged so that the polarization direction of the first layer 8-1 and that of the second layer 8-2 of the piezoelectric thin film 8 are reversed in the device similar to Example 4 by forming a doped portion between the layers.

Similarly to Example 4, as shown in FIG. 9 (a), the Pt lower electrode 9-1 was formed on the Si (100) substrate 1 while intervening the protection layer 7. Then, as shown in FIG. 9 (b), ZnO was used as the material and the ion beam evaporating method was employed similarly to Example 4, so that the first layer 8-1 of the piezoelectric thin film 8 was formed. The film forming conditions and the thickness were made to be the same.

Then, Al was evaporated to a thickness of 0.002 mm in the same vacuum while maintaining the substrate temperature at 200° C. The aforesaid Al is diffused in the upper surface of the first layer 8-1 of the ZnO piezoelectric thin film 8 and changes the crystalline characteristics of only the surface portion. Then, the second layer 8-2 of the piezoelectric thin film 8 was formed under the same film forming conditions to have the same film thickness.

After the piezoelectric thin film 8 had been formed, the upper electrode 9-2 was, as shown in FIG. 9 (c), formed in such a manner that Pt was evaporated by a thickness of 0.1 $\mu$m by the ordinary high frequency sputtering, unnecessary portions of the piezoelectric thin film 8 and the upper electrode 9-2 were removed by the ordinary photolithography as shown in FIG. 9 (d), the potassium hydroxide solution was used to perform the anisotropic etching process to remove the one side portion of the device, and the substrate in the lower portion of the device was removed.

The cantilever-like displacement device manufactured by the method according to this example was 500 $\mu$m long and 50 $\mu$m wide.

In a case where a voltage of ±3 V was applied to a portion between the lower electrode 9-1 and the upper electrode 9-2 of the thus manufactured thin film cantilever-like displacement device, the leading portion of the cantilever was vertically displaced by ±5 $\mu$m when viewed in FIGS. 9 (a) to 9 (e). As described above, a cantilever-type displacement device having the same performance as that according to Example 4 could be manufactured.

Then, similarly to Example 4, the cantilever type probe was formed in such a manner that the probe 11 for inputting/outputting information was formed at the free end of the thus manufactured cantilever type displacement device and the electrode in the circuit portion and that of the cantilever portion were brought into contact by the electrode layer 10. By using it, an STM and an information processing apparatus which used the STM were manufactured, resulting in an excellent operation similar to Example 1 to be performed.

EXAMPLE 7

This example is so arranged that the polarization direction of the first layer 8-1 and that of the second layer 8-2 of the piezoelectric thin film 8 were reversed in the device similar to Example 4 by forming a portion into which halogen such as F is doped between the layers.

Similarly to Example 4, as shown in FIG. 9 (a), the Pt lower electrode 9-1 was formed on the Si (100) substrate 1 while intervening the protection layer 7. Then, as shown in FIG. 9 (b), ZnO was used as the material and the ion beam evaporating method was employed similarly to Example 4, so that the first layer 8-1 of the piezoelectric thin film 8 was formed. The film forming conditions were made to be the same and the thickness was similarly made to be 0.1 $\mu$m. At this time, when the uppermost portion of 0.05 $\mu$m of the first layer 8-1 was formed, that is, F was mixed by 50% with the oxygen gas to be sprayed to only the final portion of the deposition of this layer so as to dope F so that the state of the thin film was changed. Then, the second layer 8-2 of the piezoelectric thin film 8 was formed under the same film forming conditions as the process for forming the first layer 8-1 to have the same thickness as that of the first layer 8-1.

After the piezoelectric thin film 8 has been formed, the upper electrode 9-2 was, as shown in FIG. 9 (c), formed in such a manner that Pt was evaporated by a thickness of 0.1 $\mu$m by ordinary high frequency sputtering, unnecessary portions of the piezoelectric thin film 8 and the upper electrode 9-2 were removed by the ordinary photolithography as shown in FIG. 9 (d), the potassium hydroxide solution was used to perform the anisotropic etching process to remove the one side portion of the device, and the substrate in the lower portion of the device was removed.

The cantilever-like displacement device manufactured by the method according to this example was 500 $\mu$m long and 50 $\mu$m wide.

In a case where a voltage of ±3 V was applied to a portion between the lower electrode 9-1 and the upper electrode 9-2 of the thus manufactured thin film cantilever-like displacement device, the leading portion of the cantilever was vertically displaced by ±5 $\mu$m when viewed in FIGS. 9 (a) to 9 (e). As described above, a cantilever-type displacement device having the same performance as that according to Example 4 could be manufactured.

Then, similarly to Example 4, the cantilever type probe was formed in such a manner that the micro-tip 11 for inputting/outputting information was formed at the free end of the thus manufactured cantilever type displacement device and the electrode in the circuit portion and that of the cantilever portion were brought into contact by the electrode layer 10. By using it, an STM and an information processing apparatus which used the STM were manufactured, resulting in an excellent operation similar to Example 1 to be performed.

EXAMPLE 8

This example is so arranged that the material of the piezoelectric thin film 8 was made to be PbTiO$_3$, which is a ferroelectric material, and the polarization direction of the first layer 8-1 and that of the second layer 8-2 of the piezoelectric thin film 8 were reversed in the device similar to Example 4 by reforming the surface of the first layer by irradiating it with Ar plasma after the first layer had been deposited so as to change the state of crystal of the second layer to be deposited on it.

Similarly to Example 4, as shown in FIG. 9 (a), the Pt lower electrode 9-1 was formed on the Si (100) substrate 1 while intervening the protection layer 7. Then, as shown in FIG. 9 (b), PbTiO$_3$ was used as the material and high frequency sputtering was used, so that the first layer 8-1 of the piezoelectric thin film 8 was formed. The film forming conditions were made that the target was PbTiO$_3$ sintered material, the substrate temperature was 600° C., the sputtering gas was a mixture of Ar and O$_2$ at a ratio of 1:1, the gas pressure was 0.5 Pa and the plasma power at the sputtering process was 200 W.

After the first layer 8-1 had been formed, the surface of this layer was continuously irradiated with Ar plasma in the same vacuum chamber. The gas pressure at this time was 0.5 Pa, the high frequency power was 200 W, and the plasma irradiation was performed for about 2 minutes. After the surface of the first layer 8-1 had been reformed, the second layer 8-2 of the piezoelectric thin film 8 was formed under the same film forming conditions as those for forming the first layer 8-1 to have the same thickness as that of the first layer 8-1.

After the piezoelectric thin film 8 had been formed, the upper electrode 9-2 was, as shown in FIG. 9 (c), formed in such a manner that Pt was evaporated by a thickness of 0.1 $\mu$m by the ordinary high frequency sputtering, unnecessary portions of the piezoelectric thin film 8 and the upper electrode 9-2 were removed by ordinary photolithography as shown in FIG. 9 (d), the potassium hydroxide solution was used to perform the anisotropic etching process to remove one side portion of the device, and the substrate in the lower portion of the device was removed.

The cantilever-like displacement device manufactured by the method according to this example was 500 $\mu$m long and 50 $\mu$m wide.

In a case where a voltage of ±3 V was applied to a portion between the lower electrode 9-1 and the upper electrode 9-2 of the thus manufactured thin film cantilever-like displacement device, the leading portion of the cantilever was vertically displaced by ±8 $\mu$m when viewed in FIGS. 9 (a) to 9 (e).

Then, similarly to Example 4, the cantilever type probe was formed in such a manner that the micro-tip 11 for inputting and/or outputting information was formed at the free end of the thus manufactured cantilever type displacement device and the electrode in the circuit portion and that of the cantilever portion were brought into contact by the electrode layer 10. By using it, an STM and an information processing apparatus which used the STM were manufactured, resulting in an excellent operation similar to Example 4 to be performed.

EXAMPLE 9

This example is so arranged that the material of the piezoelectric thin film 8 was made to be PbTiO$_3$, which is a ferroelectric material, and the polarization direction of the first layer 8-1 and that of the second layer 8-2 of the piezoelectric thin film 8 were reversed in the device similar to Example 4 by reforming the surface of the first layer by irradiating it with O$_2$ plasma after the first layer had been deposited so as to change the state of crystal of the second layer to be deposited on it.

Similarly to Example 4, as shown in FIG. 9 (a), the Pt lower electrode 9-1 was formed on the Si (100) substrate 1 while intervening the protection layer 7. Then, as shown in FIG. 9 (b), PbTiO$_3$ was used as the material and the ion beam evaporation was used, so that the first layer 8-1 of the piezoelectric thin film 8 was formed. The film forming operation was performed by using the ion beam evaporating device shown in FIG. 10 which comprised the evaporation source 69 having the crucible and the heating device, the electron discharge source 61, the accelerating electrode 62 and two ion gun portions 63 each of which is composed of an accelerating power source. The vacuum chamber 8 was exhausted to a pressure level of $5 \times 10^{-5}$ Pa or lower and PbO and Ti, which are the raw materials of the thin film, were charged into the two evaporation sources 69 before they were evaporated by heat. Furthermore, O$_2$ gas was introduced through the gas jetting port 65 at a rate of 12 ml/min., and the film was formed while spraying it to the surface of the substrate. The PbO and Ti ionizing currents were made to be 100 mA, and the accelerating voltage was 0.5 kV. The substrate temperature was 500° C. and the thickness of the film was made to be the same as that according to Example 4.

After the first layer 8-1 had been formed, the surface of this layer was continuously irradiated with a plasma of a mixture gas of O$_2$ and Ar in the same vacuum chamber. The ratio O$_2$:Ar was 2:1, the gas pressure at this time was 0.5 Pa, the high frequency power was 200 W, and the plasma irradiation was performed for about 2 minutes. After the surface of the first layer 8-1 had been reformed, the second layer 8-2 of the piezoelectric thin film 8 was formed under the same film forming conditions as those for forming the first layer 8-1 to have the same thickness as that of the first layer 8-1.

After the piezoelectric thin film 8 had been formed, the upper electrode 9-2 was, as shown in FIG. 9 (c), formed in such a manner that Pt was evaporated by a thickness of 0.1 μm by the ordinary high frequency sputtering, unnecessary portions of the piezoelectric thin film 8 and the upper electrode 9-2 were removed by the ordinary photolithography as shown in FIG. 9 (d), the potassium hydroxide solution was used to perform the anisotropic etching process to remove one side portion of the device, and the substrate in the lower portion of the device is removed.

The cantilever-like displacement device manufactured by the method according to this example was 500 μm long and 50 μm wide.

In a case where a voltage of ±3 V was applied to a portion between the lower electrode 9-1 and the upper electrode 9-2 of the thus manufactured thin film cantilever-like displacement device, the leading portion of the cantilever was vertically displaced by ±8 μm when viewed in FIG. 9.

Then, similarly to Example 4, the cantilever type probe was formed in such a manner that the micro-tip 11 for inputting and/or outputting information was formed at the free end of the thus manufactured cantilever type displacement device and the electrode in the circuit portion and that of the cantilever portion were brought into contact by the electrode layer 10. By using it, an STM and an information processing apparatus which used the STM were manufactured, resulting in an excellent operation similar to Example 1 to be performed.

EXAMPLE 10

This example is so arranged that the material of the piezoelectric thin film 8 was made to be PbTiO$_3$, which is a ferroelectric material, and the polarization direction of the first layer 8-1 and that of the second layer 8-2 were reversed in the device similar to Example 4 by making the temperature of the substrate different at the time of depositing the thin film.

Similarly to Example 4, as shown in FIG. 9 (a), the Pt lower electrode 9-1 was formed on the Si (100) substrate 1 while intervening the protection layer 7. Then, as shown in FIG. 9 (b), PbTiO$_3$ was used as the material and the sol and gel method was used, so that the first layer 8-1 of the piezoelectric thin film 8 was formed by the following method:

First, the alkoxide compound of each of Pb and Ti, which are the raw materials of the thin film, were mixed and the density was adjusted while dissolving in alcohol, so that raw material liquid was prepared. Then, the aforesaid raw material liquid was caused to drop on the substrate 1, on which the lower electrode 9-1 had been formed and which had been heated to 400° C. Then, the substrate was rotated at a speed of 3000 revolutions/minute to be subjected to spin coating. Since the thin film was deposited to a thickness of 0.1 μm by each of the aforesaid processes, it was repeated three times. Hence, the first layer was formed to have a thickness of 0.3 μm. Then, the temperature of the substrate was lowered to 300° C. and spin coating was performed similarly to the process for forming the first layer 8-1, so that the second layer 8-2 was formed. However, since the thickness of the thin film deposited by one time of the spinning coating process became 0.075 μm, the spin coating process was repeated four times so as to make the thickness of the second layer 8-2 to be 0.3 μm. After the aforesaid process had been completed, an electric furnace was used to perform the heat treatment in an oxygen atmosphere at 600° C. for one hour, so that the piezoelectric thin film 8 was formed.

After the piezoelectric thin film 8 had been formed, the upper electrode 9-2 was, as shown in FIG. 9 (c), formed in such a manner that Pt was evaporated by a thickness of 0.1 μm by the ordinary high frequency sputtering, unnecessary portions of the piezoelectric thin film 8 and the upper electrode 9-2 were removed by the ordinary photolithography as shown in FIG. 9 (d), the potassium hydroxide solution was used to perform the anisotropic etching process to remove one side portion of the device, and the substrate in the lower portion of the device was removed.

The cantilever-like displacement device manufactured by the method according to this example was 500 μm long and 50 μm wide.

In a case where a voltage of ±3 V was applied to a portion between the lower electrode 9-1 and the upper electrode 9-2 of the thus manufactured thin film cantilever-like displacement device, the leading portion of the cantilever was vertically displaced by ±8 μm when viewed in FIG. 9.

Then, similarly to Example 4, the cantilever type probe was formed in such a manner that the micro-tip 11 for inputting and/or outputting information was formed at the free end of the thus manufactured cantilever type displacement device and the electrode in the circuit portion and that of the cantilever portion were brought into contact by the electrode layer 10. By using it, an STM and an information processing apparatus which used the STM were manufactured, resulting in an excellent operation similar to Example 1 to be performed.

In addition to the aforesaid effects, the cantilever-like displacement device according to the present invention can be arranged so that the intermediate electrode can be omitted from the conventional cantilever comprising the piezoelectric bimorph. Therefore, the stress control between the layers of the piezoelectric thin film can be easily performed, causing the problem of the film separation at the interface to be overcome. Furthermore, the generation of cracks in the piezoelectric film can be prevented. Therefore, a thin film cantilever type displacement device, which can be formed into a multi-cantilever structure, which can be integrated, and which exhibits satisfactory durability against repeated displacement, and a cantilever-type probe can be stably provided by a simple manufacturing process.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A probe drive mechanism, comprising:
    a cantilever portion having a piezoelectric layer disposed between electrode layers, a micro-tip for detecting a tunnel current and an electrode for receiving said tunnel current;
    a processing circuit portion, positioned adjacent to said cantilever portion, which drives said cantilever portion and detects and amplifies said tunnel current;
    a substrate for supporting said cantilever portion and said processing portion; and
    a protection layer covering said circuit portion and a portion of said substrate, wherein said cantilever portion is formed on said protection layer adjacent to said processing circuit portion.

2. A probe drive mechanism according to claim 1, wherein the thickness of said protection layer is in a range from 3000Å to 12000Å.

3. A probe drive mechanism according to claim 1, wherein the thickness of said protection layer is in a range from 5000Å to 12000Å.

4. A probe drive mechanism according to claim 1, wherein said substrate is made of silicon.

5. A probe drive mechanism according to claim 1, wherein material of said electrode layer in said circuit portion is aluminum or an aluminum-silicon alloy.

6. A probe drive mechanism according to claim 1, wherein said processing circuit portion includes a first insulating layer of silicon oxide.

7. A probe drive mechanism according to claim 1, wherein said processing circuit portion includes a second insulating layer of silicon oxide.

8. A probe drive mechanism according to claim 1, wherein said cantilever includes an electrode made of noble metal.

9. A probe drive mechanism according to claim 1, wherein the piezoelectric material in said cantilever portion is selected from a group consisting of AlN, ZnO, $Ta_2O_3$, $PbTiO_3$, $Bi_4Ti_3O_{12}$, $BaTiO_3$ and $LiNbO_3$.

10. A probe drive mechanism according to claim 1, wherein the material of said protection layer is SiON, $Si_3N_4$ or $SiO_2$.

11. A probe drive mechanism, comprising:
    a cantilever portion having a piezoelectric layer disposed between electrode layers, a micro-tip for detecting a tunnel current and an electrode for receiving said tunnel current;
    a processing circuit portion positioned adjacent to said cantilever portion which drives said cantilever portion and detects and amplifies said tunnel current;
    a substrate for supporting said cantilever portion and said circuit portion; and
    a protection layer covering said circuit portion and a portion of said substrate, wherein said cantilever portion is formed on said protection layer adjacent to said circuit portion, and said piezoelectric layer of said cantilever portion is composed of a plurality of stacked layers having polarization axes in different polarization directions.

12. A probe drive mechanism according to claim 11, wherein the thickness of said protection layer is in a range from 3000Å to 12000Å.

13. A probe drive mechanism according to claim 11, wherein the thickness of said protection layer is in a range from 5000Å to 12000Å.

14. A probe drive mechanism according to claim 11, wherein said substrate is made of silicon.

15. A probe drive mechanism according to claim 11, wherein said circuit portion includes an electrode layer made of aluminum or an aluminum-silicon alloy.

16. A probe drive mechanism according to claim 11, wherein said processing circuit portion includes a first insulating layer of silicon oxide.

17. A probe drive mechanism according to claim 11, wherein said processing circuit portion includes a second insulating layer of silicon oxide.

18. A probe drive mechanism according to claim 11, wherein material of said electrode layers in said cantilever portion is noble metal.

19. A probe drive mechanism according to claim 11, wherein said piezoelectric material in said cantilever portion is selected from a group consisting of AlN, ZnO, $Ta_2O_3$, $PbTiO_3$, $Bi_4Ti_3O_{12}$, $BaTiO_3$ and $LiNbO_3$.

20. A probe drive mechanism according to claim 11, wherein an interface of said piezoelectric layer has an intermediate layer disposed between upper and lower layers, and said intermediate layer has a polarization direction different from the polarization direction of said upper and lower piezoelectric layers.

21. A probe drive mechanism according to claim 11, wherein said piezoelectric layer includes an upper, a lower and an intermediate layer disposed between said upper and lower layers, and the polarization direction of polarization axes of said piezoelectric layer continuously changes between said upper and lower layer and said intermediate layer.

22. A probe drive mechanism according to claim 11, wherein said piezoelectric layer has a plurality of stacked layers, each of which is deposited so that spontaneous polarization directions thereof become different at the time of depositing said piezoelectric layer.

23. A probe drive mechanism according to claim 11, wherein the thickness of said piezoelectric layer is in a range from 500Å to 10 $\mu$m.

24. A probe drive mechanism according to claim 11, wherein the thickness of said electrode layers is in a range from $\frac{1}{8}$ to 1/10 of the thickness of said piezoelectric layer.

25. A probe drive mechanism according to claim 11, wherein said piezoelectric layer has a plurality of layers made of the same material.

26. A probe drive mechanism according to claim 11, wherein the material of said protection layer is SiON, $Si_3N_4$ or $SiO_2$.

27. A multiple probe drive mechanism, comprising:
a plurality of probe drive mechanisms, each comprising:
a cantilever portion having a piezoelectric layer disposed between electrode layers, a micro-tip for detecting a tunnel current and an electrode for receiving the tunnel current;
a processing circuit portion, positioned adjacent to said cantilever portion, which drives said cantilever portion and detects and amplifies the tunnel current;
a substrate for supporting said cantilever portion and said processing portion; and
a protection layer covering said circuit portion and a portion of said substrate, wherein said cantilever portion is formed on said protection layer adjacent to said processing circuit portion, wherein said probe drive mechanisms are formed on the same substrate.

28. A probe drive mechanism according to claim 27, wherein said piezoelectric layer in said cantilever portion is composed of a plurality of stacked layers having polarization axes in different polarization directions.

29. A probe drive mechanism according to claim 28, wherein the material of said protection layer is SiON, $Si_3N_4$ or $SiO_2$.

30. A scanning tunnel microscope, comprising:
a cantilever portion having a piezoelectric layer disposed between electrode layers, a micro-tip for detecting a tunnel current and an electrode for receiving the tunnel current;
a processing circuit portion, positioned adjacent to said cantilever portion, which drives said cantilever portion and detects and amplifies the tunnel current;
a substrate for supporting said cantilever portion and said processing portion;
a protection layer covering said circuit portion and a portion of said substrate, wherein said cantilever portion is formed on said protection layer adjacent to said processing circuit portion;
means for relatively moving said micro-tip with respect to a sample having a surface to be observed;
means for applying voltage between said micro-tip and the sample; and
means for detecting an electric current which passes between said micro-tip and the sample.

31. A scanning tunnel microscope according to claim 30, wherein said piezoelectric layer in said cantilever portion is composed of a plurality of stacked layers having polarization axes in different polarization directions.

32. A scanning tunnel microscope according to claim 30, wherein the material of said protection layer is SiON, $Si_3N_4$ or $SiO_2$.

33. A method of using a probe drive mechanism in a scanning tunnel microscope, the probe drive mechanism having a cantilever portion with a piezoelectric layer disposed between electrode layers, a micro-tip for detecting a tunnel current and an electrode for receiving said tunnel current, a processing circuit portion, positioned adjacent to the cantilever portion, which drives the cantilever portion and detects and amplifies the tunnel current, a substrate for supporting the cantilever portion and the processing portion, a protection layer covering the circuit portion and a portion of said substrate, wherein the cantilever portion is formed on the protection layer adjacent to the processing circuit portion, said method comprising the steps of:
relatively moving the micro-tip with respect to a sample having a surface to be observed;
applying a voltage between the micro-tip and the sample, and
detecting an electric current which passes between the micro-tip and the sample.

* * * * *

UNITED STATES PATENT AND TRADEMARK OFFICE
CERTIFICATE OF CORRECTION

PATENT NO. : 5,334,835
DATED : August 2, 1994
INVENTOR(S) : Nakayama et al.

It is certified that error appears in the above-indentified patent and that said Letters Patent is hereby corrected as shown below:

Title Page:
[56] REFERENCES CITED:

FOREIGN PATENT DOCUMENTS, please insert the following:

| | | |
|---|---|---|
| 62-174983 | 7/1987 | Japan |
| 0449409 | 10/1991 | Europe |
| 0492915 | 7/1992 | Europe |
| 0382192 | 8/1990 | Europe |
| WO 8907256 | 8/1989 | PCT |

OTHER PUBLICATIONS, "Binning," should read --Binnig,--.

Attorney, Agent, or Firm, "Fitzpatrick, Cella Harper & Scinto should read --Fitzpatrick, Cella, Harper & Scinto--.

COLUMN 1:

Line 9, "prove" should read --probe--.
Line 30, "expotentially" should read --exponentially--.

COLUMN 4:

Line 60, "layers." should read --layers,--.

UNITED STATES PATENT AND TRADEMARK OFFICE
CERTIFICATE OF CORRECTION

PATENT NO. : 5,334,835  Page 2 of 2
DATED : August 2, 1994
INVENTOR(S) : Nakayama et al.

It is certified that error appears in the above-indentified patent and that said Letters Patent is hereby corrected as shown below:

COLUMN 27:

Line 30, "claim 28," should read --claim 27,--.

Signed and Sealed this

Twenty-second Day of August, 1995

Attest:

BRUCE LEHMAN

*Attesting Officer*  *Commissioner of Patents and Trademarks*